US012736758B2

(12) United States Patent
Hata et al.

(10) Patent No.: US 12,736,758 B2

(45) Date of Patent: Sep. 15, 2026

(54) OPTICAL CONNECTOR SYSTEM

(71) Applicant: KYOCERA CORPORATION, Kyoto (JP)

(72) Inventors: Tetsuya Hata, Yokohama (JP); Hidehiro Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 319 days.

(21) Appl. No.: 18/579,304

(22) PCT Filed: Jul. 1, 2022

(86) PCT No.: PCT/JP2022/026522

§ 371 (c)(1),
(2) Date: Jan. 12, 2024

(87) PCT Pub. No.: WO2023/286643

PCT Pub. Date: Jan. 19, 2023

(65) Prior Publication Data

US 2025/0231353 A1 Jul. 17, 2025

(30) Foreign Application Priority Data

Jul. 13, 2021 (JP) ................................ 2021-115942

(51) Int. Cl.
*G02B 6/38* (2006.01)

(52) U.S. Cl.
CPC .................................. *G02B 6/387* (2013.01)

(58) Field of Classification Search
CPC ...................................................... G02B 6/387
See application file for complete search history.

(56) References Cited

U.S. PATENT DOCUMENTS 6,485,192 B1 11/2002 Plotts et al.
9,720,186 B2 8/2017 Matsubara et al.
11,422,315 B2 8/2022 Otomitsu
2016/0216459 A1 7/2016 Matsubara et al.
2019/0384005 A1 12/2019 Brusberg et al.
(Continued)

FOREIGN PATENT DOCUMENTS

CN 112368619 A 2/2021
JP 2011075688 A 4/2011
JP 2014112218 A 6/2014
(Continued)

*Primary Examiner* — Lisa M Caputo

(74) *Attorney, Agent, or Firm* — Duane Morris LLP

(57) ABSTRACT

In an optical connector system (1) according to the present disclosure, a first optical connector module (2) includes a first optical connector (21) attached to a first optical transmission line (40) and a housing (22) covering the first optical connector (21). A second optical connector module (3) includes a second optical connector (31) attached to a second optical transmission line (50) and mated with the first optical connector (21) and a casing (32) located apart from the second optical connector (31) and attached to a substrate (51). In a mating direction, a leading end of the housing (22) is located closer to the second optical connector module (3) than a leading end of the first optical connector (21), and a leading end of the casing (32) is located closer to the first optical connector module (2) than a leading end of the second optical connector (31).

10 Claims, 18 Drawing Sheets

(56) References Cited

U.S. PATENT DOCUMENTS

2019/0391350 A1 12/2019 Evans et al.
2023/0354541 A1* 11/2023 Cole ........................ H05K 7/10

FOREIGN PATENT DOCUMENTS

JP 6113853 B2 4/2017
WO 2015046488 A1 4/2015
WO 2017102517 A1 6/2017

* cited by examiner

XV
XIV
41(40)
2
XIII
3
1
50
51
52
RIGHT
FRONT
UP
DOWN
REAR
LEFT 41 (40)
2
22
222b
222e
222c
21
1
3
32
321a
324
322
31
50
51
52
UP
DOWN
RIGHT
LEFT
FRONT
REAR

FIG. 5

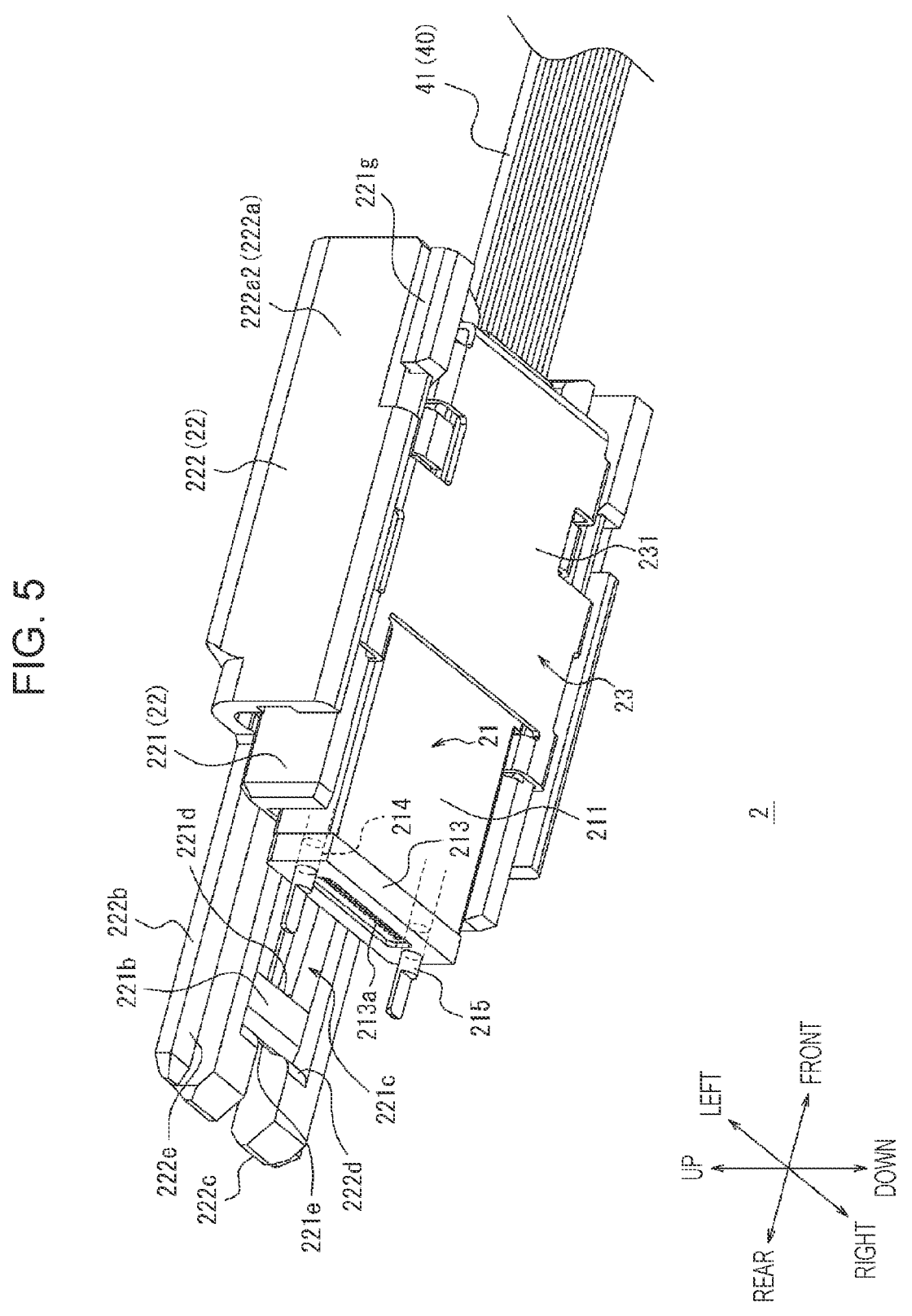

41 (40)
221g
222a2 (222a)
222 (22)
231
23
21
221 (22)
214
213
211
221d
222b
221b
213a
215
221c
222e
222c
221e
222d
2
LEFT
FRONT
UP
DOWN
REAR
RIGHT 2
222 (22)
222a1 (222a)
222b
222c
222a2 (222a)
221 (22)
221a1 (221a)
221h
221i
221j
221 (22)
221c
221b
221d
221e
221f
221g
221a2 (221a)
26
261
262
263
25
41 (40)
RIGHT
FRONT
UP
DOWN
REAR
LEFT
21
212
241
245
242
243
244
24
211b (211)
211a (211)
215
214
213a
213
23
237
235
234
236
233
231
232b (232)
232a (232)

FIG. 7

221f
222f
222 (22)
221 (22)
21
214
213a
231
213
215
221a2 (221a)
222a2 (222a)
23
232
222c
222b
221b
222e
2
UP
DOWN
LEFT
RIGHT 222g
222f
222 (22)
221 (22)
26
234
236
221j
222h
24
41 (40)
2
244
221h
237
221a1 (221a)
221i
222a1 (222a)
235
23
221g
23
222a2 (222a)
221a2 (221a)
UP
DOWN
LEFT
RIGHT 222 (22)
222f
222a1 (222a)
222g
222h
222a2 (222a)
222e
222d
222b
222c
FRONT
LEFT
UP
DOWN
RIGHT
REAR 2
222 (22)
221 (22)
221h
221i
41 (40)
236
237
25
263
235
23
245
231
241
211a
(211)
233
211b
(211)
21
213a
215
213
222d
222c
221e
221d
221b
221c
222b
222h
221j
222a1 (222a)
212
244
24
262
242
26
261
221a1 (221a)
UP
DOWN
FRONT
REAR 50
51
52
C
31
311
312
314a (314)
A1
313
315
UP
DOWN
RIGHT
LEFT
FRONT
REAR 1
32
221a2 (221a)
221 (22)
222 (22)
222e
222b
21
215
211
324
221b
326
214
322b (322)
322a (322)
321b2
(321b, 321)
UP
DOWN
LEFT
RIGHT 1
222 (22)
221 (22)
25
2
23
211a (211)
221j
233
222h
326
213a
213
21
324
222b
221b
312
314a (314)
221c
311
31
325
221d
3
222d
221e
321a (321)
222c
32
50
51
52
UP
FRONT
DOWN
REAR 3
32
322
31
322b
322a
324
323
321a (321)
325
326
50
51
52
321b2
(321b, 321)
327
321b1
(321b, 321)
RIGHT
FRONT
UP
DOWN
REAR
LEFT

OPTICAL CONNECTOR SYSTEM

CROSS-REFERENCE TO RELATED APPLICATIONS

The present application claims priority to Japanese Patent Application No. 2021-115942, filed on Jul. 13, 2021, which is hereby incorporated by reference herein in its entirety.

TECHNICAL FIELD

The present disclosure relates to an optical connector system.

BACKGROUND OF INVENTION

A known optical connector system optically couples optical transmission lines. In such an optical connector system, reducing coupling loss between optical transmission lines requires accurate alignment of a first optical connector attached to a first optical transmission line and a second optical connector attached to a second optical transmission line.

For example, Patent Literature 1 discloses an optical connector that allows optical transmission lines to be suitably aligned with each other. The optical connector disclosed in Patent Literature 1 includes a receptacle and a plug. The receptacle includes an exposure hole through which an end face of a first optical transmission line is exposed. The plug includes a protrusion including a leading end face at which an end face of a second optical transmission line is exposed. The protrusion of the plug is inserted into the exposure hole, thereby aligning the optical transmission lines with each other.

CITATION LIST

Patent Literature

Patent Literature 1: Japanese Patent No. 6113853

SUMMARY

In an embodiment of the present disclosure, an optical connector system includes a first optical connector module and a second optical connector module mated with the first optical connector module. The first optical connector module includes a first optical connector and a housing. The first optical connector is attached to a leading end of a first optical transmission line including a plurality of first optical waveguide portions, the leading end being located adjacent to the second optical connector module. The housing covers the first optical connector. The second optical connector module includes a second optical connector and a casing. The second optical connector is attached to a second optical transmission line including a substrate and a second optical waveguide portion stacked on the substrate, and is mated with the first optical connector. The casing is located apart from the second optical connector and is attached to the substrate. In a mating direction in which the first optical connector module and the second optical connector module are mated with each other, a leading end of the housing is located closer to the second optical connector module than a leading end of the first optical connector, and a leading end of the casing is located closer to the first optical connector module than a leading end of the second optical connector.

BRIEF DESCRIPTION OF THE DRAWINGS

FIG. 5 is an upward perspective view of the first optical connector module alone in FIG. 1 holding the first optical transmission line.

FIG. 7 is a rear view of the first optical connector module alone of FIG. 4A.

DESCRIPTION OF EMBODIMENTS

In the optical connector disclosed in Patent Literature 1, the end face of the second optical transmission line is exposed at the leading end face of the protrusion of the plug. Once the plug and the receptacle are misaligned from each other during insertion, therefore, the leading end face may come into contact with a portion of the receptacle that is other than the exposure hole, causing damage to the end face of the second optical transmission line. Damage to optical components including the optical transmission lines results in a significant reduction in optical transmission characteristics. Therefore, avoiding such damage requires to accurately align the plug with the receptacle and insert the plug into the receptacle. This leads to poor ease of mating in the optical connector.

In an embodiment of the present disclosure, an optical connector system allows accurate alignment of optical transmission lines and exhibits improved ease of mating in the optical connector system.

An embodiment of the present disclosure will be described in detail below with reference to the accompanying drawings. In the following description, front-rear, left-right, and up-down directions are based on directions of arrows in the figures. The directions of the arrows in different figures, FIGS. 1 to 16, are consistent with each other.

As used herein, a mating direction includes, for example, the front-rear direction. A direction orthogonal to the mating direction includes, for example, the left-right direction. A location close to or adjacent to a first optical connector module, or first-optical-connector-module side, includes a front side, for example. A location close to or adjacent to a second optical connector module, or second-optical-connector-module side, includes a rear side, for example. A location close to or adjacent to a substrate, or substrate side, includes a lower side, for example. A location remote from the substrate includes an upper side, for example.

Figure 1:
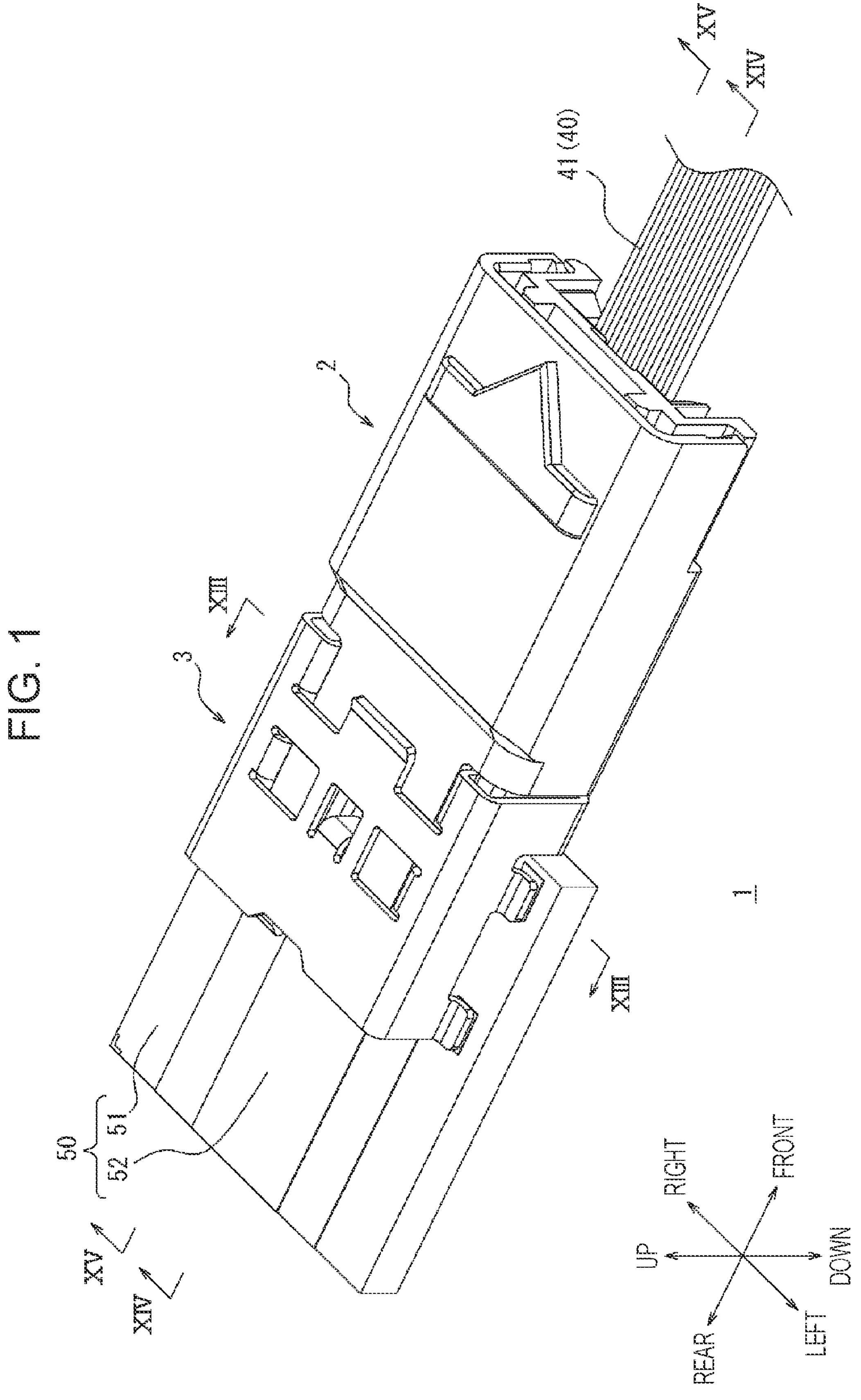
FIG. 1 is a downward perspective view of an optical connector system according to an embodiment in a mated state.
Figure 2:
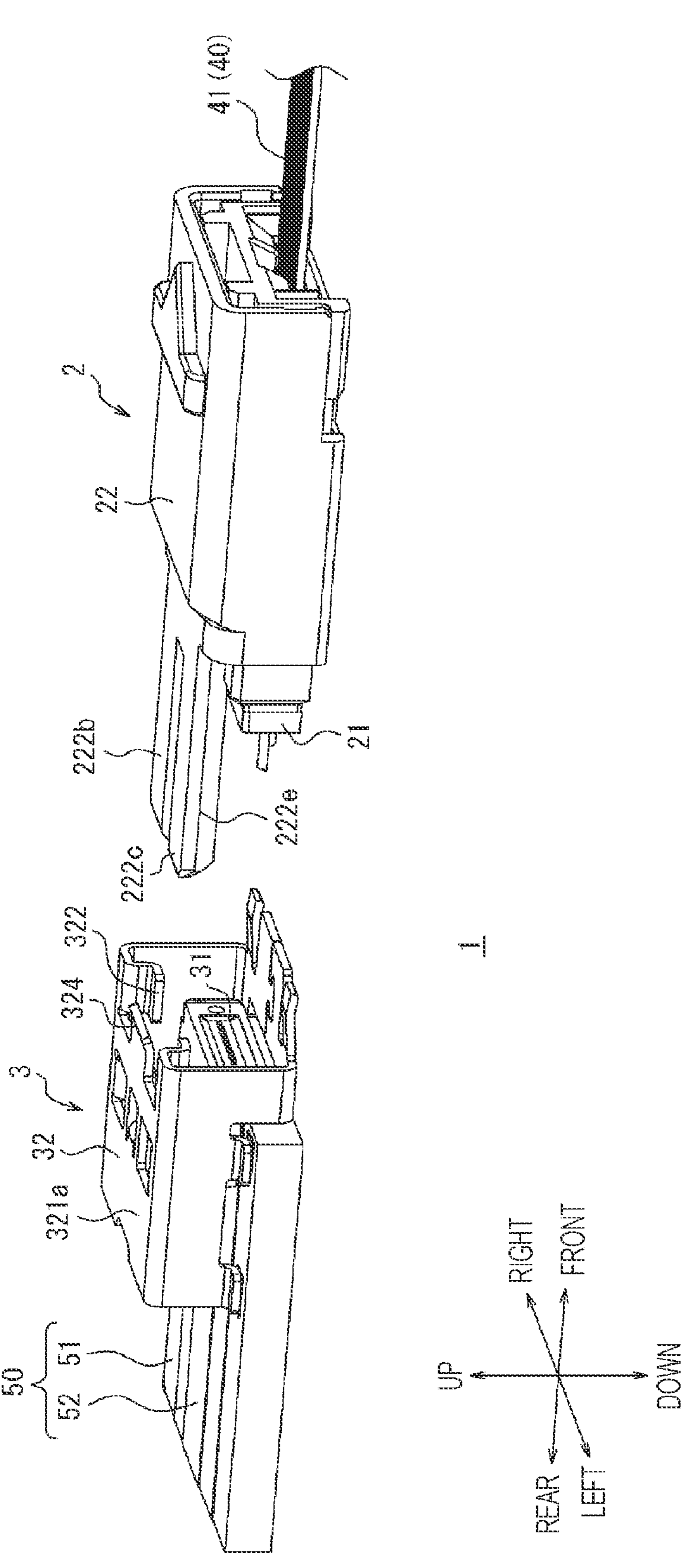
FIG. 2 is a downward perspective view of the optical connector system according to the embodiment in an unmated state.

FIG. 1 is a downward perspective view of an optical connector system 1 according to an embodiment in a mated state. FIG. 2 is a downward perspective view of the optical connector system 1 according to the embodiment in an unmated state. The configuration and functions of the optical connector system 1 will be described in brief with reference to FIGS. 1 and 2.

The optical connector system 1 includes a first optical connector module 2 and a second optical connector module 3 mated with the first optical connector module 2.

The first optical connector module 2 holds a first optical transmission line 40 including multiple first optical waveguide portions 41. Each of the first optical waveguide portions 41 includes a single optical fiber. The first optical transmission line 40 includes multiple optical fibers, serving as the multiple first optical waveguide portions 41, arranged in a single row in the left-right direction. Each of the first optical waveguide portions 41 includes a core and a cladding and may further include a coating as necessary.

A waveguide mode of the first optical waveguide portion 41 may be either single-mode or multi-mode. The first optical waveguide portion 41 may include any type of optical fiber, such as a general-purpose single-mode fiber, a dispersion-shifted single-mode fiber, or a step-index multimode optical fiber. The multiple first optical waveguide portions 41 may be tied together and covered with a sheath or do not need to be tied together. A pitch of the cores of the multiple first optical waveguide portions 41, held by the first optical connector module 2, in the left-right direction substantially matches a pitch of cores 521 in a second optical transmission line 50, which will be described later, in the left-right direction.

The second optical connector module 3 is attached to the second optical transmission line 50, which includes a substrate 51 and a second optical waveguide portion 52 stacked on the substrate 51.

Figure 3:
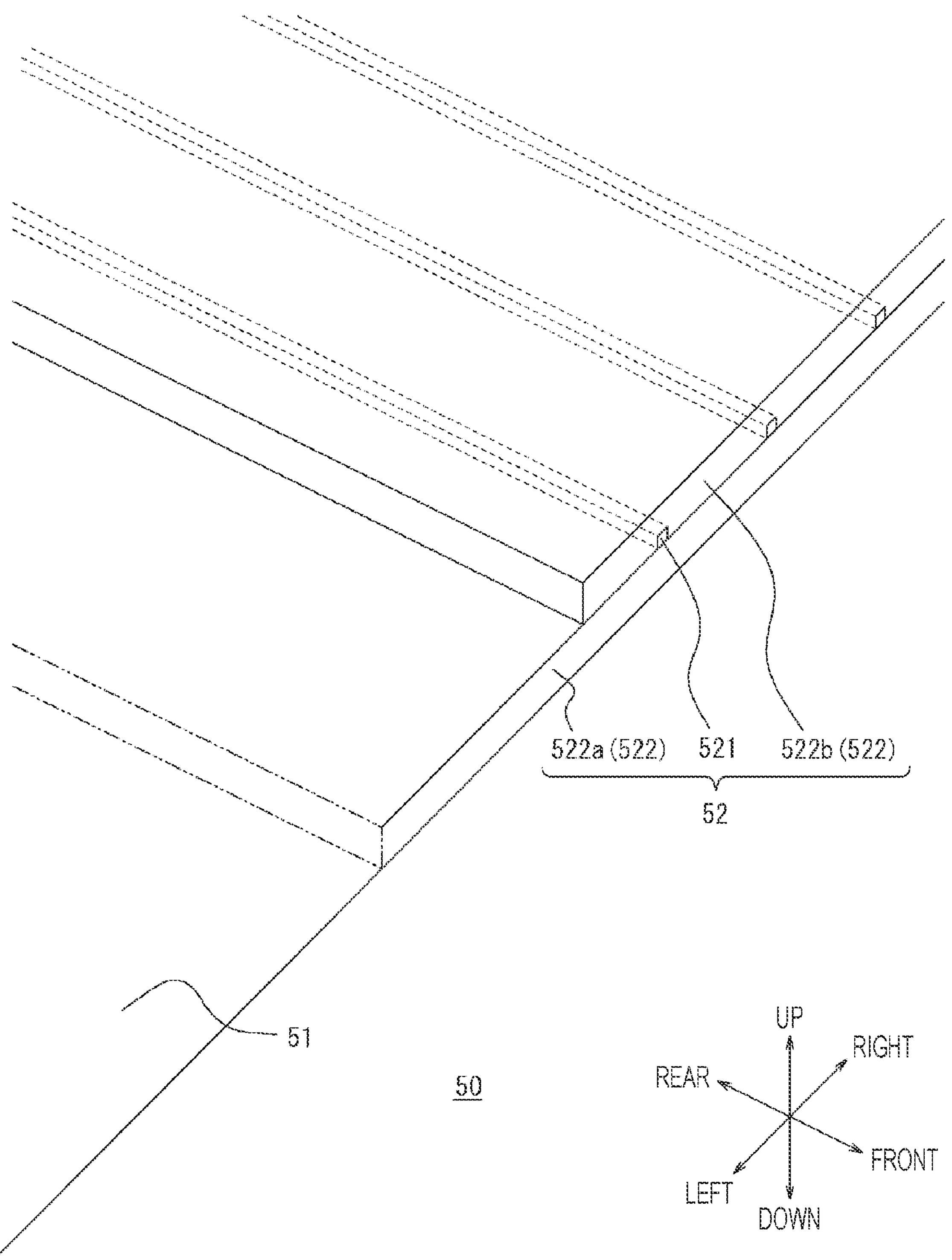
FIG. 3 is an enlarged downward perspective view of a second optical transmission line alone in FIG. 1.

FIG. 3 is an enlarged downward perspective view of the second optical transmission line 50 alone in FIG. 1. The configuration of the second optical transmission line 50 will now be described with reference to FIG. 3.

The second optical transmission line 50 includes the substrate 51, which includes a rigid printed wiring board, and the second optical waveguide portion 52 stacked on an upper surface of the substrate 51. The second optical waveguide portion 52 is raised or protrudes upward from the upper surface of the substrate 51. An end face of the second optical waveguide portion 52 in the front-rear direction coincides with an end face of the substrate 51 in the front-rear direction for optical coupling with a second optical connector 31, which will be described later. The end face of the second optical waveguide portion 52 in the front-rear direction is flat along the end face of the substrate 51 in the front-rear direction. A waveguide mode of the second optical waveguide portion 52 may be either single-mode or multimode.

The second optical waveguide portion 52 includes the cores 521 and claddings 522 stacked on the substrate 51 in a stacking direction perpendicular to the substrate 51. More specifically, the second optical waveguide portion 52 includes a first cladding **522*a* stacked on the upper surface of the substrate 51. The second optical waveguide portion 52 includes the cores 521 stacked on the first cladding 522*a*. The second optical waveguide portion 52 includes a second cladding 522*b*, which covers the cores 521 such that the cores 521 are sandwiched between the first cladding 522*a* and the second cladding 522*b*** in the stacking direction.

The multiple cores 521 are spaced from each other at regular intervals in the left-right direction. Each of the cores 521 extends in the front-rear direction. The cores 521 and the claddings 522 are made of an appropriate material, such as quartz-based glass. The cores 521 have a higher refractive index than the claddings 522. In the following description, it is assumed that the second optical waveguide portion 52 is an embedded type optical waveguide. The second optical waveguide portion 52 may be of another type. The second optical waveguide portion 52 may be an optical waveguide of an appropriate type, such as a slab type or a semi-embedded type.

When the waveguide mode of the second optical waveguide portion 52 is single-mode, each of the cores 521 has a core size ranging, for example, from 5 μm to 15 μm. When the waveguide mode of the second optical waveguide portion 52 is multi-mode, the core 521 has a core size ranging, for example, from 35 μm to 62.5 μm. As used herein, the core size refers to an actual size of the core 521, rather than a mode field diameter, for example. The refractive index of the core 521 is, for example, 1.6.

The second optical transmission line 50 is fabricated by using photolithography, for example. The method of fabrication is performed such that the first cladding **522*a*, the cores 521, and the second cladding 522*b* are fabricated in that order. The fabrication method for the second optical transmission line 50 includes stacking the first cladding 522*a*, which is included in the second optical waveguide portion 52, on the substrate 51 in the stacking direction perpendicular to the substrate 51. The fabrication method for the second optical transmission line 50 includes stacking the cores 521, which are included in the second optical waveguide portion 52, on the first cladding 522*a*. The fabrication method for the second optical transmission line 50 includes stacking the second cladding 522*b*, which is included in the second optical waveguide portion 52, to sandwich the cores 521 between the first cladding 522*a* and the second cladding 522*b*** in the stacking direction.

Again referring to FIGS. 1 and 2, the first optical transmission line 40 and the second optical transmission line 50 are optically coupled to each other in the mated state in which the first optical connector module 2 and the second optical connector module 3 are mated with each other.

Figure 4A:
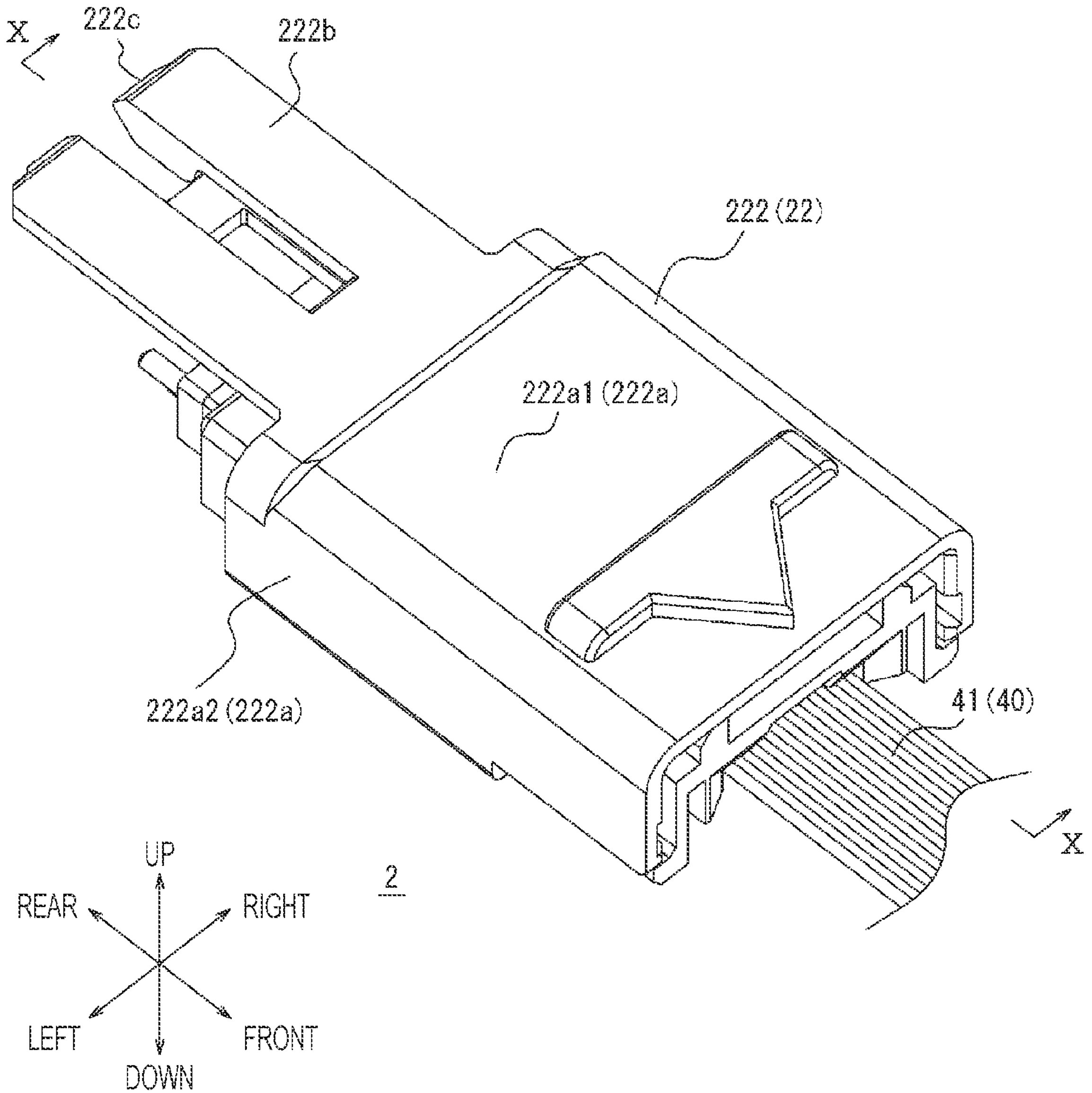
FIG. 4A is a downward perspective view of a first optical connector module alone in FIG. 1 holding a first optical transmission line.
Figure 4B:
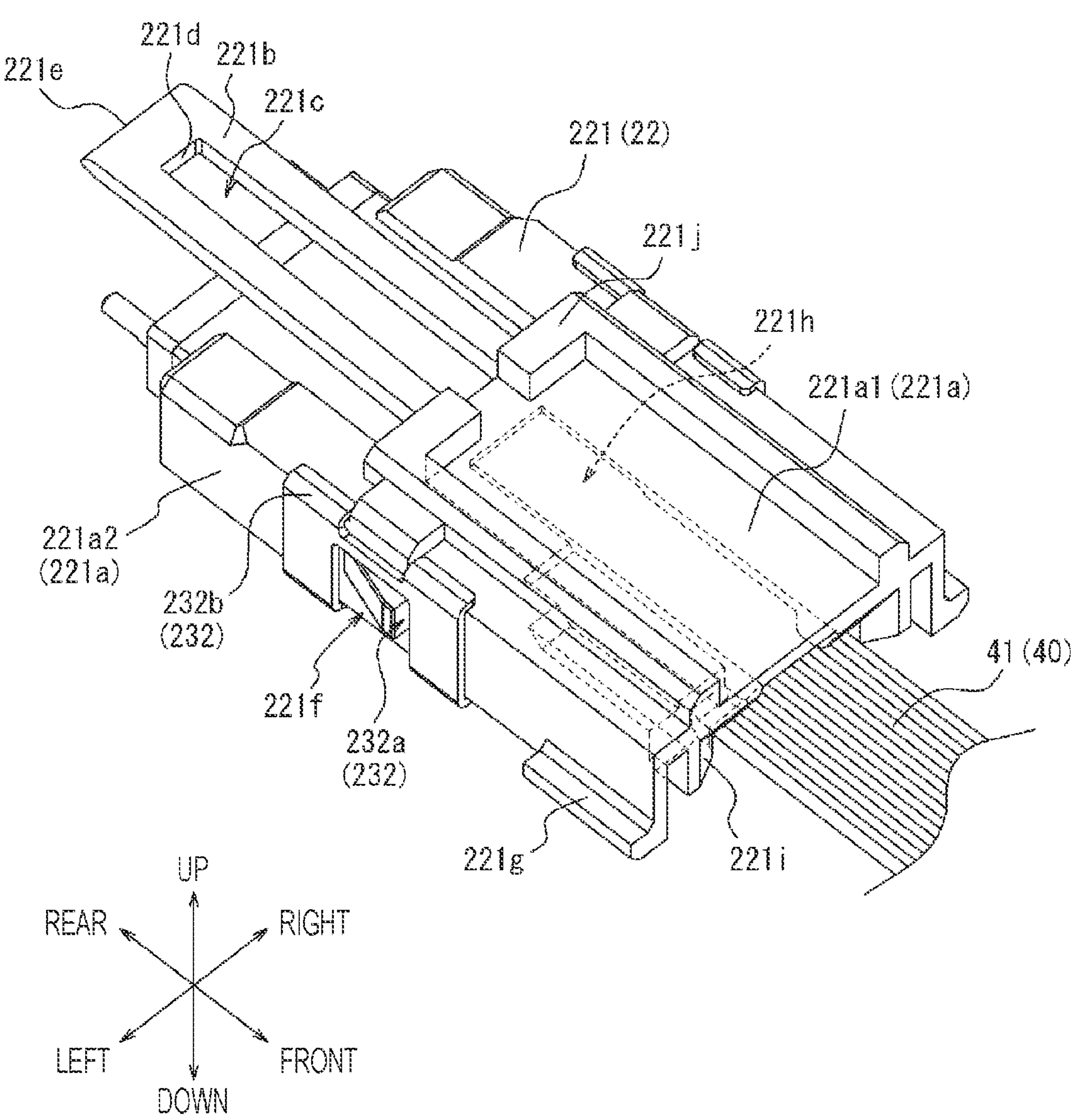
FIG. 4B is a downward perspective view of part of the first optical connector module alone of FIG. 4A.
Figure 4C:
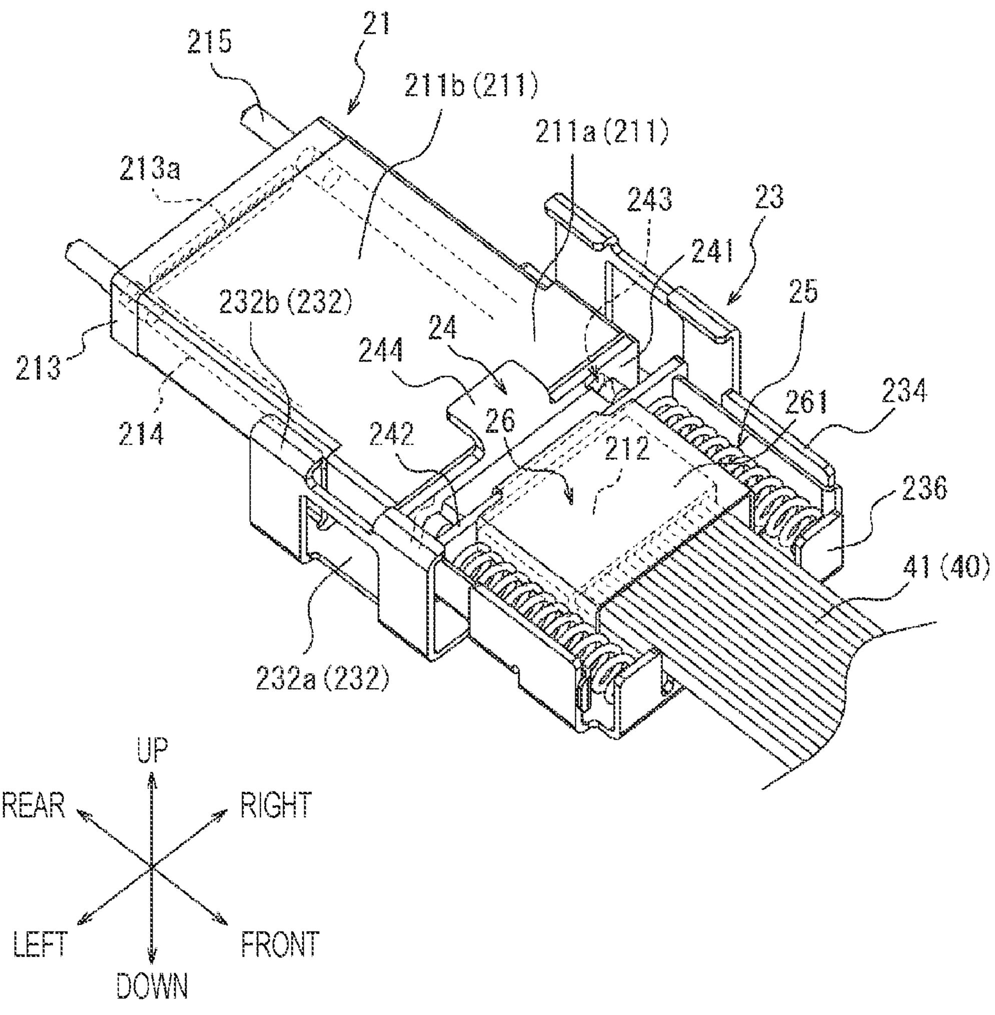
FIG. 4C is a downward perspective view of part of the first optical connector module alone of FIG. 4B.
Figure 6:
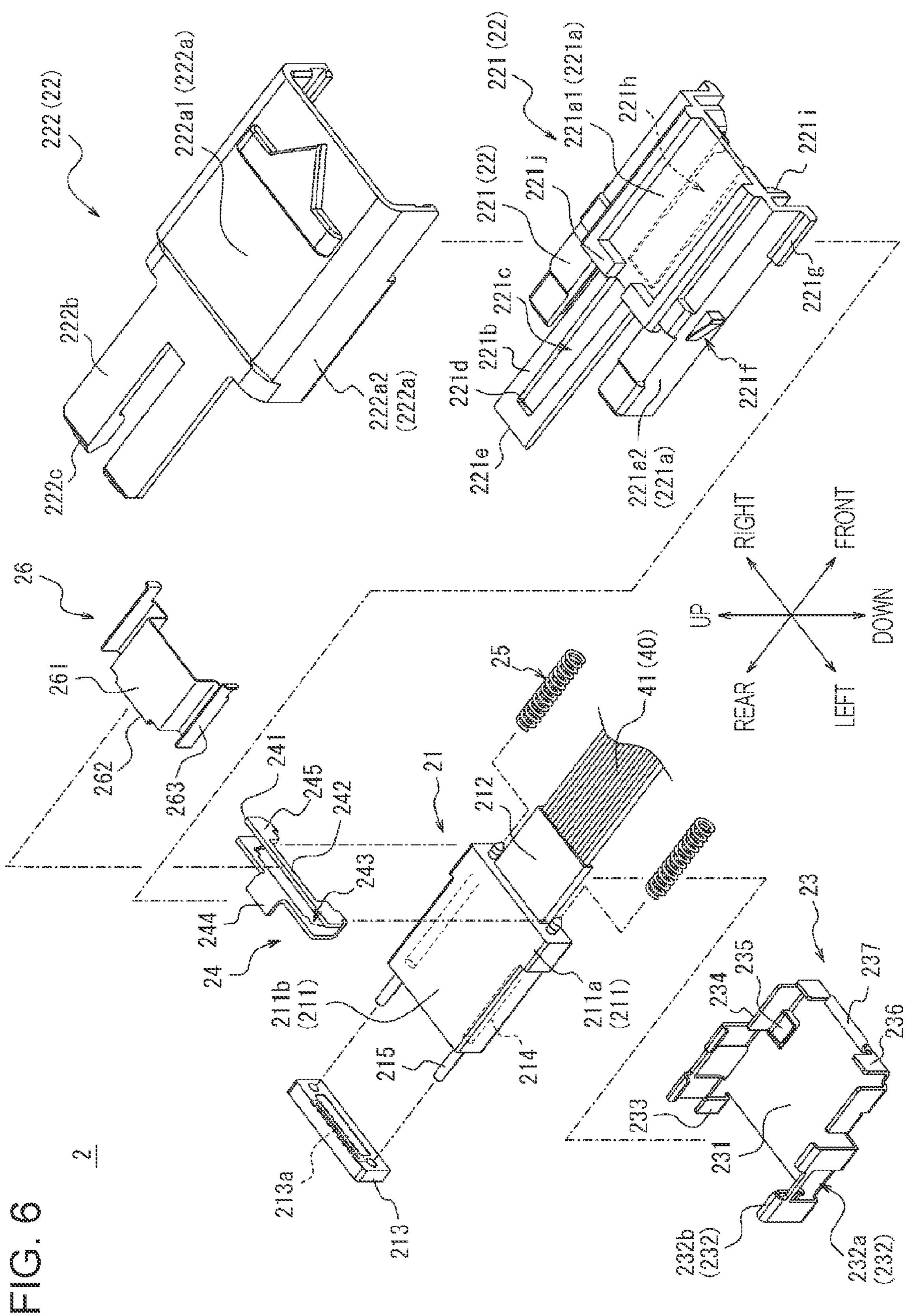
FIG. 6 is an exploded downward perspective view of the first optical connector module alone of FIG. 4A.
Figure 7:
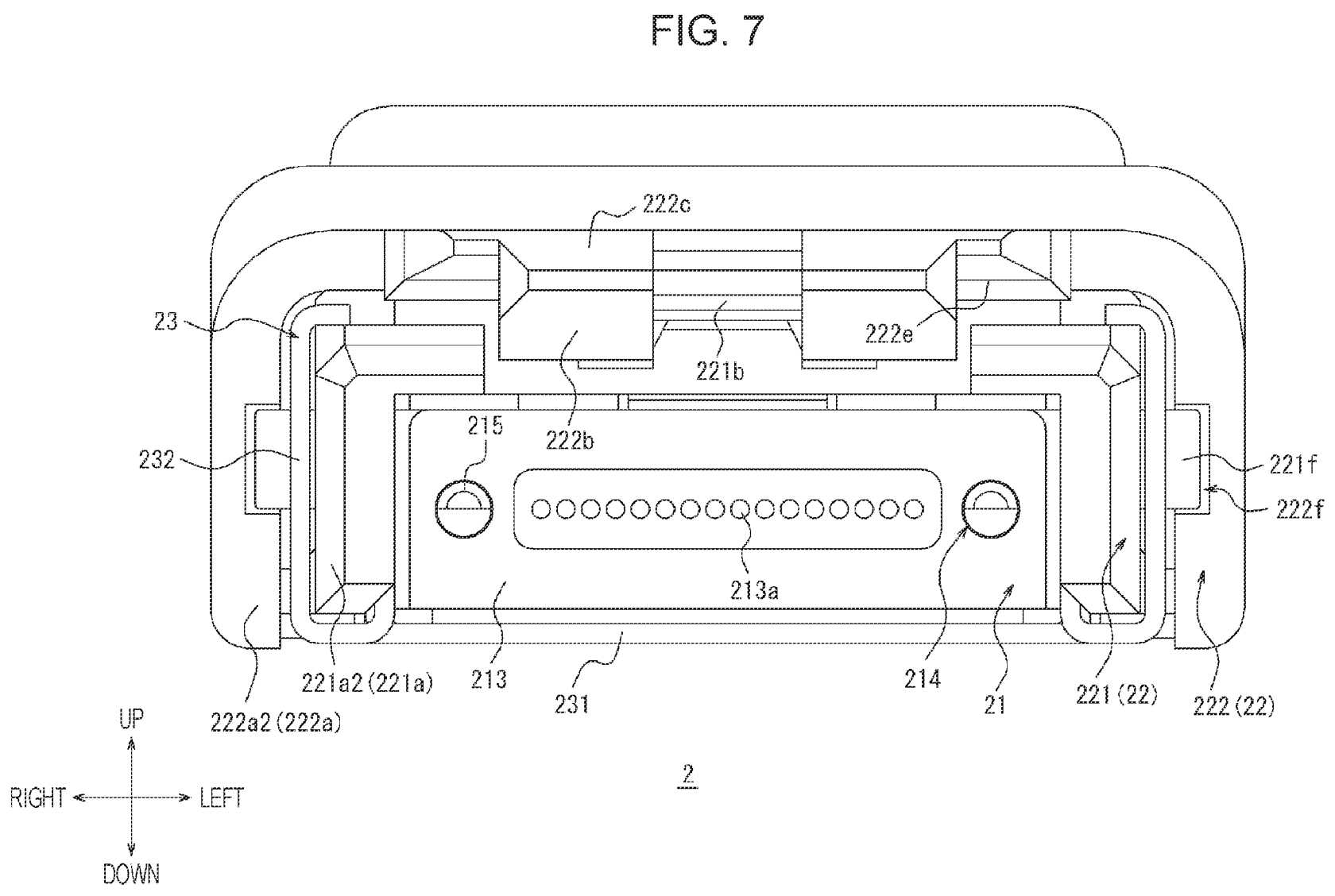
Figure 8:
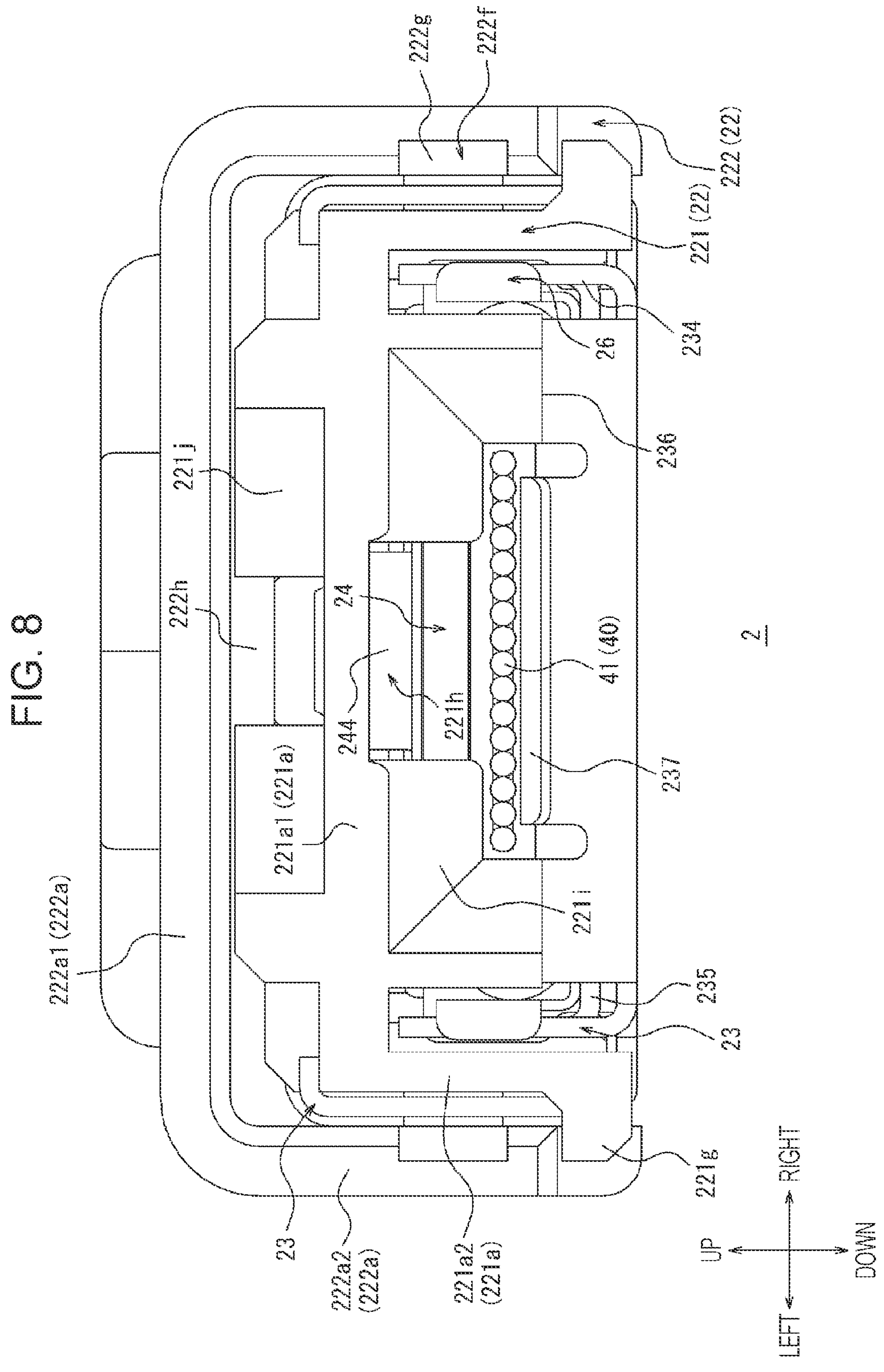
FIG. 8 is a front view of the first optical connector module alone of FIG. 4A.
Figure 9:
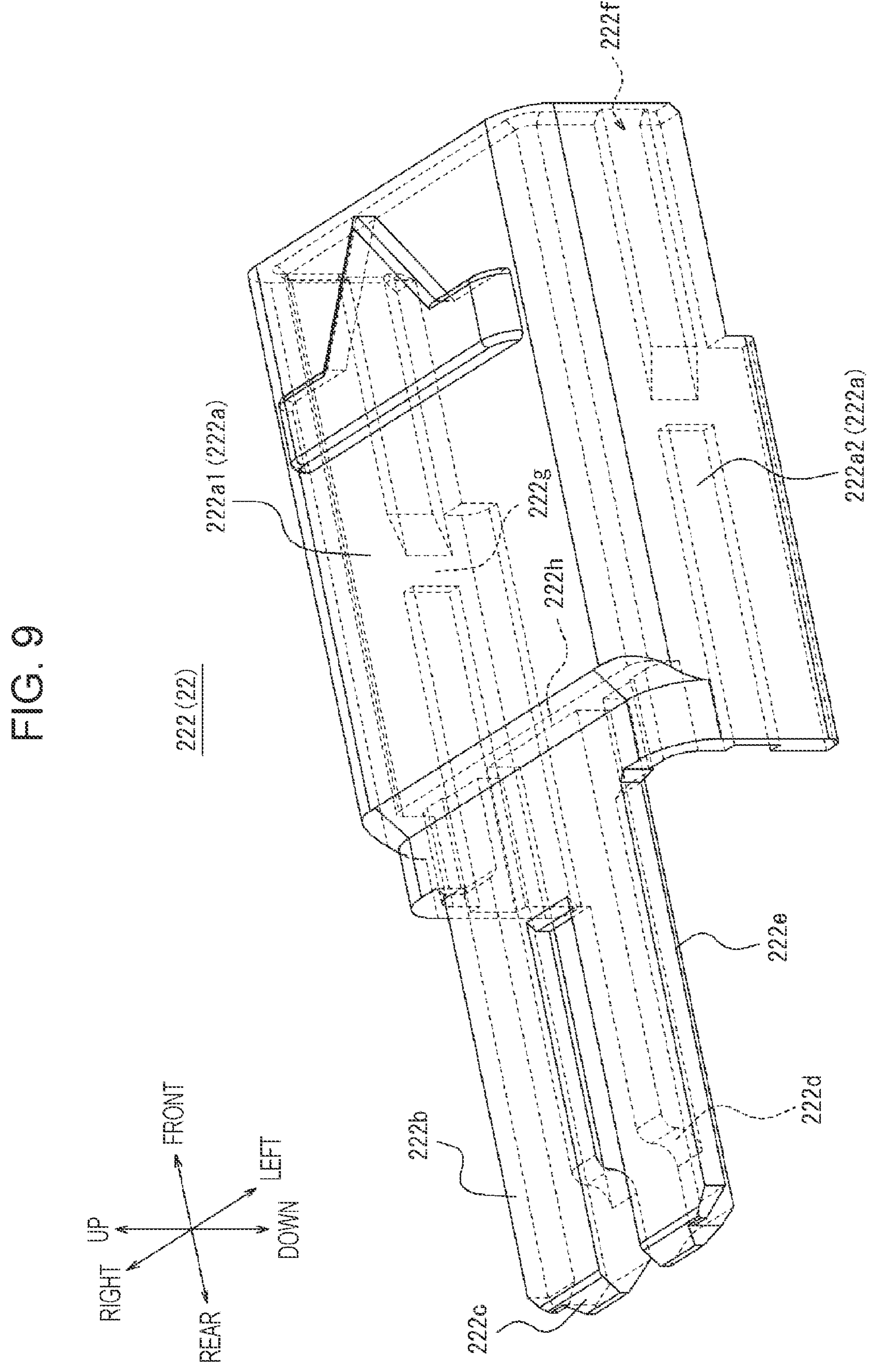
FIG. 9 is a downward perspective view of a second housing alone.
Figure 10:
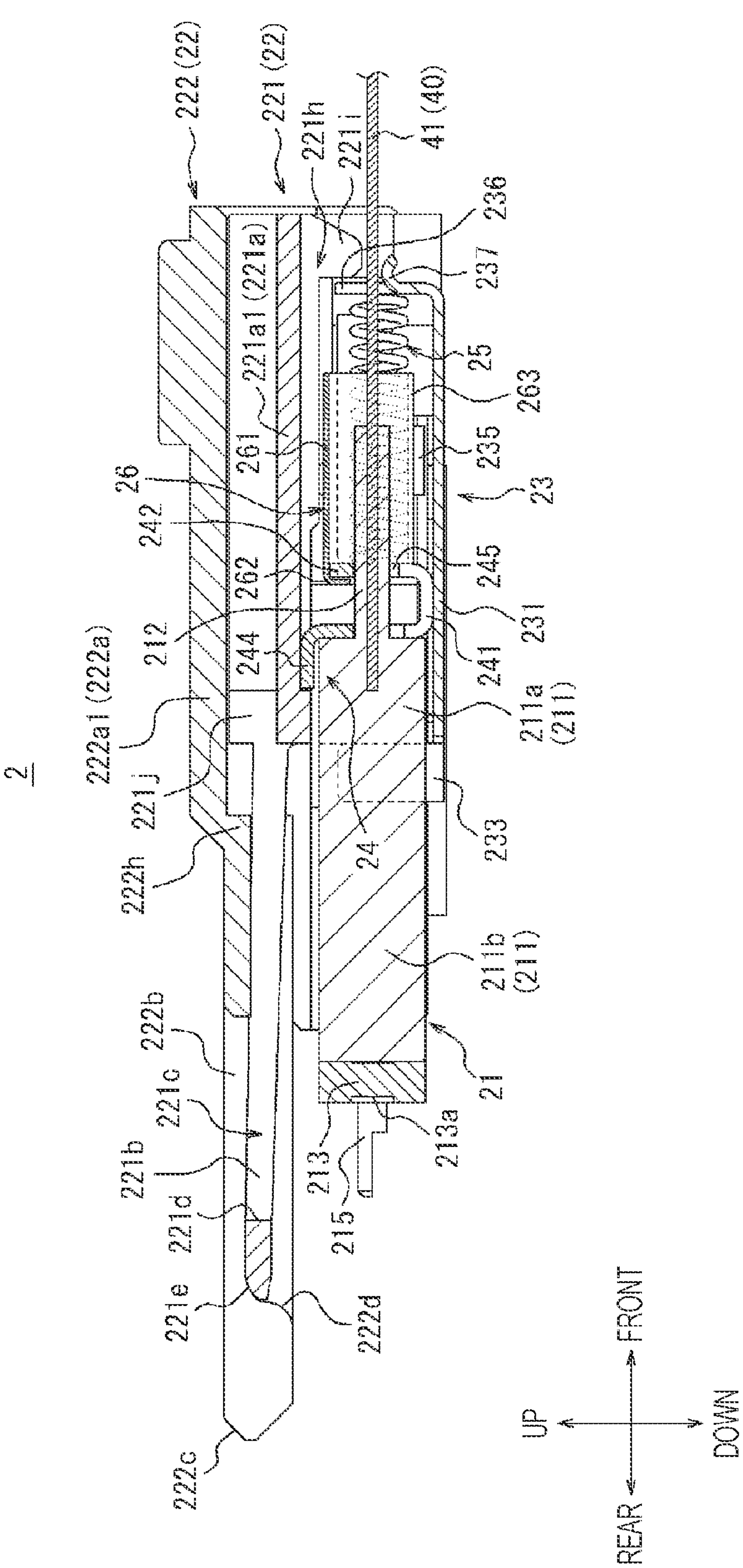
FIG. 10 is a sectional view taken along arrow line X-X in FIG. 4A.

FIG. 4A is a downward perspective view of the first optical connector module 2 alone in FIG. 1 holding the first optical transmission line 40. FIG. 4B is a downward perspective view of part of the first optical connector module 2 alone of FIG. 4A. FIG. 4C is a downward perspective view of part of the first optical connector module 2 alone of FIG. 4B. FIG. 5 is an upward perspective view of the first optical connector module 2 alone in FIG. 1 holding the first optical transmission line 40. FIG. 6 is an exploded downward perspective view of the first optical connector module 2 alone of FIG. 4A. FIG. 7 is a front view of the first optical connector module 2 alone of FIG. 4A. FIG. 8 is a rear view of the first optical connector module 2 alone of FIG. 4A. FIG. 9 is a downward perspective view of a second housing 222 alone. FIG. 10 is a sectional view taken along arrow line X-X in FIG. 4A. An exemplary configuration of the first optical connector module 2 will now be mainly described with reference to FIGS. 4A to 10.

The first optical connector module 2 includes a first optical connector 21 and a housing 22. The first optical connector 21 is attached to a leading end of the first optical transmission line 40 including the multiple first optical waveguide portions 41 that is located adjacent to the second optical connector module 3. The housing 22 covers the first optical connector 21. The first optical connector module 2 includes a first fitting 23, which is placed from below on the first optical connector 21. The first optical connector module 2 includes a second fitting 24, which is placed from above on the first optical connector 21. The first optical connector module 2 includes coil springs 25, which are located between a front end of the first fitting 23 and a front end of the second fitting 24. The first optical connector module 2 includes a third fitting 26 sandwiched between the coil springs 25 in the first fitting 23.

The first optical connector 21 is made of, for example, a light-transmissive resin material, and has a rectangular shape. The first optical connector 21 is made of a material having a refractive index close to that of the core of each first optical waveguide portion 41.

As illustrated in FIGS. 4C and 6, the first optical connector 21 includes a base 211, which has a rectangular shape and constitutes half or more of an outer portion of the first optical connector 21. The base 211 includes a wide portion 211*a*, which extends from a front end of the base 211 and is larger in width than the other portion of the base 211 on opposite sides in the left-right direction. The base 211 includes a narrow portion 211*b*, which extends rearward from the wide portion 211*a* and is smaller in width than the wide portion 211*a* on the opposite sides in the left-right direction. The first optical connector 21 includes a holding portion 212, which is rectangular and extends forward from a central part of a front end face of the base 211.

The first optical connector 21 includes a first lens unit 213 attached to an entire rear end face of the base 211. The first lens unit 213 includes multiple first lenses 213*a* arranged in a single row in the left-right direction. A pitch of the multiple first lenses 213*a* in the left-right direction substantially matches the pitch of the cores of the multiple first optical waveguide portions 41, held by the first optical connector module 2, in the left-right direction. The first lens unit 213 is made of a light-transmissive resin material.

The first optical connector 21 includes through-holes 214, which are located in opposite sides of the first optical connector 21 in the left-right direction and extend through the base 211 and the first lens unit 213 in the front-rear direction. The first optical connector 21 includes pins 215, each of which extends through the through-hole 214 and is exposed from opposite ends of the through-hole 214 in the front-rear direction. The two pins 215 are located at opposite sides of the single row of the multiple first lenses 213*a* in the left-right direction to sandwich the first lenses 213*a* therebetween in the left-right direction. The pins 215 except rear end portions thereof are cylindrical such that each pin has a circular cross-sectional shape. A lower half of the rear end portion of each pin 215 is cut such that the rear end portion of the pin has a semicircular cross-sectional shape.

As illustrated in FIG. 6, the housing 22 is made of an insulating and heat-resistant synthetic resin material. The housing 22 includes a first housing 221, which covers, from above and the opposite sides in the left-right direction, the first optical connector 21 holding the first optical transmission line 40. The housing 22 includes the second housing 222, which is located outside the first housing 221 and further covers, from above and the opposite sides in the left-right direction, the first optical connector 21 together with the first housing 221.

The first housing 221 includes a base 221*a*, which covers, from above and the opposite sides in the left-right direction, the first optical connector 21 holding the first optical transmission line 40. The base 221*a* includes a ceiling portion 221*a*1 and side wall portions 221*a*2 arranged in the left-right direction. The ceiling portion 221*a*1 covers the first optical connector 21 from above. The side wall portions 221*a*2 protrude further toward the second optical connector module 3 than the ceiling portion 221*a*1.

The first housing 221 includes a protrusion 221*b*, which protrudes from the base 221*a* toward the second optical connector module 3 in the mating direction. The protrusion 221*b* linearly protrudes rearward from a middle part of a rear face of the ceiling portion 221*a*1 of the base 221*a* in the left-right direction. The protrusion 221*b* protrudes further toward the second optical connector module 3 than the side wall portions 221*a*2 of the base 221*a*. A rear end of the protrusion 221*b* is located further rearward than rear ends of the side wall portions 221*a*2. The protrusion 221*b* has a cut in its entire central part, and has a U-shaped overall shape.

The first housing 221 includes a locked portion 221*c*, which is defined by the cut in the protrusion 221*b*. The first housing 221 includes a locked face 221*d*, which constitutes part of the locked portion 221*c* and includes a front face of the protrusion 221*b* that is located in the cut. The first housing 221 includes a leading end face 221*e*, which is rounded at a rear or leading end of the protrusion 221*b*.

The first housing 221 includes engaging portions 221*f*, each of which includes a part protruding outward in the left-right direction from the middle of an outer surface of the side wall portion 221*a*2 and extending obliquely forward at an angle relative to the side wall portion 221*a*2. The first housing 221 includes first protruding walls 221*g*, each of which is located at a lower front corner of the outer surface of the side wall portion 221*a*2. The first protruding walls 221*g* protrude outward in the left-right direction while extending linearly in the front-rear direction. The first housing 221 includes a recess 221*h* located at the middle of an inner surface of the ceiling portion 221*a*1 in the left-right direction. The recess 221*h* is formed in substantially the whole of the ceiling portion 221*a*1 in the front-rear direction and has a predetermined width in the left-right direction.

As illustrated in FIG. 8, the first housing 221 includes an extending portion 221*i*, which protrudes downward from a front end of the inner surface of the ceiling portion 221*a*1 and has an inverted L-shape. Two extending portions 221*i* are located on the inner surface of the ceiling portion 221*a*1 and are spaced at a predetermined distance from each other in the left-right direction. As illustrated in FIG. 6, the first housing 221 includes second protruding walls 221*j*, which extend in the left-right direction at a rear end of an outer surface of the ceiling portion 221*a*1 and protrude upward.

The second housing 222 includes a base 222*a*, which covers, from above and the opposite sides in the left-right direction, the first optical connector 21 holding the first optical transmission line 40 in conjunction with the base 221*a* of the first housing 221. The base 222*a* is located outside the base 221*a* and covers, from outside, the base 221*a* and the first optical connector 21. The base 222*a* includes a ceiling portion 222*a*1 and side wall portions 222*a*2. The ceiling portion 222*a*1 covers, from above, the ceiling portion 221*a*1 and the first optical connector 21. The side wall portions 222*a*2 are arranged in the left-right direction and extend downward from the ceiling portion 222*a*1 while being bent.

The second housing 222 includes a protrusion 222*b*, which protrudes from the base 222*a* toward the second optical connector module 3 in the mating direction. The protrusion 222*b* linearly protrudes rearward from a central part in the left-right direction of a rear face of the ceiling portion 222*a*1 of the base 222*a*. The protrusion 222*b* has a cut in its entire central part and is two-pronged when viewed as a whole.

As illustrated in FIG. 9, the second housing 222 includes guiding faces 222*c*, which are located at a rear or leading end of the protrusion 222*b* and slope obliquely downward and rearward. The second housing 222 includes curved faces 222*d*, which are located at an inner edge of the protrusion 222*b* in the direction orthogonal to the mating direction and are smoothly curved in an S-shape. The second housing 222 includes supported portions 222*e*, each of which is located at an outer edge of the protrusion 222*b* in the direction orthogonal to the mating direction and extends in the mating direction. The supported portions 222*e* each include a surface that faces toward the substrate 51 and that is located remoter from the substrate 51 than a surface of the protrusion 222*b* that faces toward the substrate 51.

The second housing 222 includes grooves 222*f*, each of which linearly extends from a front end of an inner surface of the side wall portion 222*a*2 to a rear end thereof in the mating direction. The second housing 222 includes engaging portions 222*g*, each of which is located at the middle of the groove 222*f* and fills part of the groove 222*f*. The second housing 222 includes a protruding wall 222*h*, which extends in the left-right direction at a rear end of an inner surface of the ceiling portion 222*a*1 and protrudes downward.

The first fitting 23 is formed by shaping a sheet of any metallic material into a form illustrated in FIG. 6 with a progressive die (stamping). The method of forming the first fitting 23 includes, after stamping, bending a workpiece in a direction along the thickness of the workpiece. The method of forming the first fitting 23 is not limited to this example. The method may include a stamping-based step alone.

The first fitting 23 includes a bottom plate 231, which constitutes a lower portion of the fitting. The first fitting 23 includes engaging portions 232, which extend upward from opposite edges of a rear portion of the bottom plate 231 in the left-right direction. The engaging portions 232 each include a cutout 232*a* and a first bent portion 232*b*. The cutout 232*a* is formed by cutting out a rectangular portion from the first fitting 23. The first bent portion 232*b* extends inward from an upper end of the engaging portion 232 in the left-right direction while being bent.

The first fitting 23 includes first extending portions 233, which extend upward from the bottom plate 231 in a rear end portion of the first fitting 23 while being inwardly bent in a J-shape in the left-right direction. The first fitting 23 includes second extending portions 234, which extend upward from opposite edges of a front portion of the bottom plate 231 in the left-right direction. A distance between the two second extending portions 234 is smaller than that between the two engaging portions 232. The first fitting 23 includes supporting portions 235, each of which is L-shaped and extends from a middle part of the second extending portion 234 inwardly in the left-right direction. The first fitting 23 includes receiving portions 236, which extend upward from a front end of the bottom plate 231 and are located at opposite parts of the front end in the left-right direction. The first fitting 23 includes a second bent portion 237, which extends upward from a middle part of the front end of the bottom plate 231 in the left-right direction while being bent.

The second fitting 24 is formed by shaping a sheet of any metallic material into a form illustrated in FIG. 6 with a progressive die (stamping). The method of forming the second fitting 24 includes, after stamping, bending a workpiece in a direction along the thickness of the workpiece. The method of forming the second fitting 24 is not limited to this example. The method may include a stamping-based step alone.

The second fitting 24 includes a base 241, which is U-shaped in side view in the front-rear direction. The second fitting 24 includes coupling portions 242, which are located at front and rear upper ends of the base 241 and extend linearly in the left-right direction. The coupling portions 242 couple opposite ends of the base 241 in the left-right direction.

The second fitting 24 includes semicircular cuts 243, which are located at opposite parts of a rear portion of the base 241 in the left-right direction. The second fitting 24 includes a supporting portion 244, which extends rearward from a middle part of the rear coupling portion 242 of the base 241 in the left-right direction. The second fitting 24 includes flat receiving portions 245, which are located at opposite ends of a front portion of the base 241 in the left-right direction.

The third fitting 26 is formed by shaping a sheet of any metallic material into a form illustrated in FIG. 6 with a progressive die (stamping). The method of forming the third fitting 26 includes, after stamping, bending a workpiece in a direction along the thickness of the workpiece. The method of forming the third fitting 26 is not limited to this example. The method may include a stamping-based step alone.

The third fitting 26 includes a ceiling portion 261, which constitutes an upper portion of the fitting. The third fitting 26 includes a bent portion 262, which is bent in an L-shape and extends downward from a middle part of a rear edge of the ceiling portion 261 in the left-right direction. The third fitting 26 includes covering portions 263, which are bent in a U-shape and extend outward from opposite sides of the ceiling portion 261 in the left-right direction.

Functions of the first optical connector module 2 in the unmated state in which the first optical connector module 2 and the second optical connector module 3 are not mated with each other will now be mainly described.

As illustrated in FIGS. 4C and 6, the second fitting 24 is placed from above on the first optical connector 21 holding the first optical transmission line 40. At this time, as illustrated in FIG. 10, a bottom surface of the base 241 of the second fitting 24 is supported by the bottom plate 231 of the first fitting 23. The coupling portions 242 of the second fitting 24 are located directly above the holding portion 212 of the first optical connector 21. As illustrated in FIG. 4C, the cuts 243 of the second fitting 24 are located directly above exposed portions of the pins 215 of the first optical connector 21 that extend forward from the through-holes 214. The second fitting 24 as a whole is supported from below by the bottom plate 231 of the first fitting 23 such that part of the second fitting 24 is located directly above the first optical connector 21.

As illustrated in FIG. 10, each of the receiving portions 245 of the second fitting 24 receives a rear end of the coil spring 25 disposed between the receiving portion 236 of the first fitting 23 and the receiving portion 245 of the second fitting 24 and compressed from a free state, in which the spring is not elastically deformed. A rear face of the base 241 of the second fitting 24 is placed against a front face of the wide portion 211*a* of the first optical connector 21 by a restoring force of the coil springs 25 exerted on the receiving portions 245. On the other hand, a rear end of the supporting portion 244 of the second fitting 24 is placed against a rear end of the recess 221*h* of the first housing 221. The first housing 221 and the first fitting 23 are attached while being fastened to each other. Therefore, the rear face of the base 241 is placed against the front face of the wide portion 211*a*, and the rear end of the supporting portion 244 is placed against the rear end of the recess 221*h*. Thus, the position of the first optical connector 21 is maintained relative to the first housing 221 and the first fitting 23 in the front-rear direction.

As illustrated in FIGS. 4C and 6, the first fitting 23 is placed from below on the first optical connector 21 holding the first optical transmission line 40. At this time, as illustrated in FIG. 10, the bottom plate 231 of the first fitting 23 supports, from below, the base 241 of the second fitting 24. Each of the receiving portions 236 of the first fitting 23 receives a front end of the coil spring 25 disposed between the receiving portion 236 of the first fitting 23 and the receiving portion 245 of the second fitting 24 and compressed from the free state in which the spring is not elastically deformed. The supporting portions 235 of the first fitting 23 support, from below, the covering portions 263 of the third fitting 26.

The first extending portions 233 of the first fitting 23 receive a rear face of the wide portion 211*a* of the first optical connector 21 pressed rearward via the second fitting 24 by the restoring force of the coil springs 25. As described above, the rear face of the base 241 of the second fitting 24 is placed against the front face of the wide portion 211*a*, and the rear end of the supporting portion 244 is placed against the rear end of the recess 221*h*. In addition, the rear face of the wide portion 211*a* is placed against the first extending portions 233 of the first fitting 23. Thus, the position of the first optical connector 21 is maintained relative to the first housing 221 and the first fitting 23 in the front-rear direction.

As illustrated in FIGS. 4C and 6, the third fitting 26 is placed from above on the first optical connector 21 holding the first optical transmission line 40. At this time, the ceiling portion 261 of the third fitting 26 covers, from above, the holding portion 212 of the first optical connector 21. The covering portions 263 of the third fitting 26 cover, from below and the opposite sides in the left-right direction, the coil springs 25 placed from above in the covering portions 263. As illustrated in FIG. 10, the covering portions 263 of the third fitting 26 are supported from below by the supporting portions 235 of the first fitting 23. The bent portion 262 of the third fitting 26 is supported from below by the coupling portion 242 of the second fitting 24.

As illustrated in FIGS. 4B and 6, the first housing 221 is placed from above on the first optical connector 21, the first fitting 23, the second fitting 24, and the third fitting 26. At this time, the first fitting 23 is fastened to the first housing 221 such that the engaging portions 232 engage the engaging portions 221*f* of the first housing 221. More specifically, the cutouts 232*a* of the engaging portions 232 engage the parts, which protrude from the outer surfaces of the side wall portions 221*a*2, of the engaging portions 221*f*. The first bent portions 232*b* of the engaging portions 232 retain upper edges of the side wall portions 221*a*2 that constitute parts of the engaging portions 221*f*. As illustrated in FIG. 10, the recess 221*h* is supported from below by the supporting portion 244 of the second fitting 24. Thus, the position of the first housing 221 is maintained relative to the first fitting 23 and the second fitting 24 in the up-down direction.

As illustrated in FIGS. 4B and 4C, the side wall portions 221*a*2 of the first housing 221 are sandwiched, from the opposite sides in the left-right direction, by the engaging portions 232 located outside the side wall portions 221*a*2 in the left-right direction and the second extending portions 234 located inside the side wall portions 221*a*2 in the left-right direction. The second extending portions 234 of the first fitting 23 and the covering portions 263 of the third fitting 26 separate the side wall portions 221*a*2 of the first housing 221 from the coil springs 25 in the left-right direction.

As illustrated in FIG. 8, once the first fitting 23 is fastened to the first housing 221, the second bent portion 237 of the first fitting 23 is located directly below the first optical transmission line 40 held by the first optical connector 21. The extending portions 221*i* of the first housing 221 are located directly above and outside the first optical transmission line 40, held by the first optical connector 21, in the left-right direction.

Once the first housing 221 is fastened to the first fitting 23, as illustrated in FIG. 5, the rear or leading end of the protrusion 221*b* of the first housing 221 is located closer to the second optical connector module 3 than a rear or leading end of the first optical connector 21. More specifically, the rear or leading end of the protrusion 221*b* of the first housing 221 is located closer to the second optical connector module 3 than rear ends of the pins 215 exposed rearward from the through-holes 214. As illustrated in FIG. 10, the protrusion 221*b* has a smaller thickness in the up-down direction than the protrusion 222*b*. The protrusion 221*b* has spring elasticity and is elastically deformable in the up-down direction.

As illustrated in FIG. 4A, the first optical connector 21, the first housing 221, the first fitting 23, the second fitting 24, the coil springs 25, and the third fitting 26 are attached to each other and are inserted rearwardly into the second housing 222 from a front side of the second housing 222. Thus, the second housing 222 is attached to the first housing 221. During insertion, the protruding parts, which protrude from the outer surfaces of the side wall portions 221*a*2, of the engaging portions 221*f* of the first housing 221 slide in the mating direction along the grooves 222*f* of the second housing 222 illustrated in FIG. 9. As a result, the protruding parts move beyond the engaging portions 222*g* of the second housing 222 and then engage the engaging portions 222*g*. Thus, as illustrated in FIG. 4A, the second housing 222 is attached to the first housing 221. The second housing 222 is attached to the first housing 221 such that the second housing 222 is movable forward relative to the first housing 221.

Once the second housing 222 is attached to the first housing 221, as illustrated in FIG. 5, the leading end of the protrusion 222*b* of the second housing 222 is located closer to the second optical connector module 3 than the leading end of the protrusion 221*b* of the first housing 221 in the mating direction. The front ends of the side wall portions 222*a*2 of the second housing 222 are located directly above the first protruding walls 221*g* of the first housing 221. The rear or leading end of the protrusion 222*b* of the second housing 222 is located closer to the second optical connector module 3 than the rear or leading end of the first optical connector 21, or the rear ends of the pins 215 exposed rearward from the through-holes 214. A leading end of the housing 22 is located closer to the second optical connector module 3 than the leading end of the first optical connector 21 in the mating direction.

Once the second housing 222 is attached to the first housing 221, as illustrated in FIG. 10, the curved faces 222*d* of the second housing 222 are located rearward of the leading end face 221*e* of the first housing 221. The curved faces 222*d* are aligned with the leading end face 221*e* in the up-down direction. The protruding wall 222*h* of the second housing 222 is located rearward of the second protruding walls 221*j* of the first housing 221. The protruding wall 222*h* is aligned with the second protruding walls 221*j* in the up-down direction.

Once the first optical connector module 2 is assembled in the above-described manner, as illustrated in FIGS. 7 and 8, the first optical connector 21 is supported only by the first fitting 23 and the second fitting 24 without being in contact with the housing 22. More specifically, the first optical connector 21 is held between the rear face of the base 241 of the second fitting 24 and the first extending portions 233 of the first fitting 23 in the mating direction. An upper surface of the first optical connector 21 is located apart from a portion of an inner surface of the first housing 221 that faces toward the upper surface. Opposite sides of the first optical connector 21 in the left-right direction are located apart from portions of the inner surface of the first housing 221 that face toward the opposite sides. A lower surface of the first optical connector 21 is located apart from the bottom plate 231 of the first fitting 23.

Figure 11:
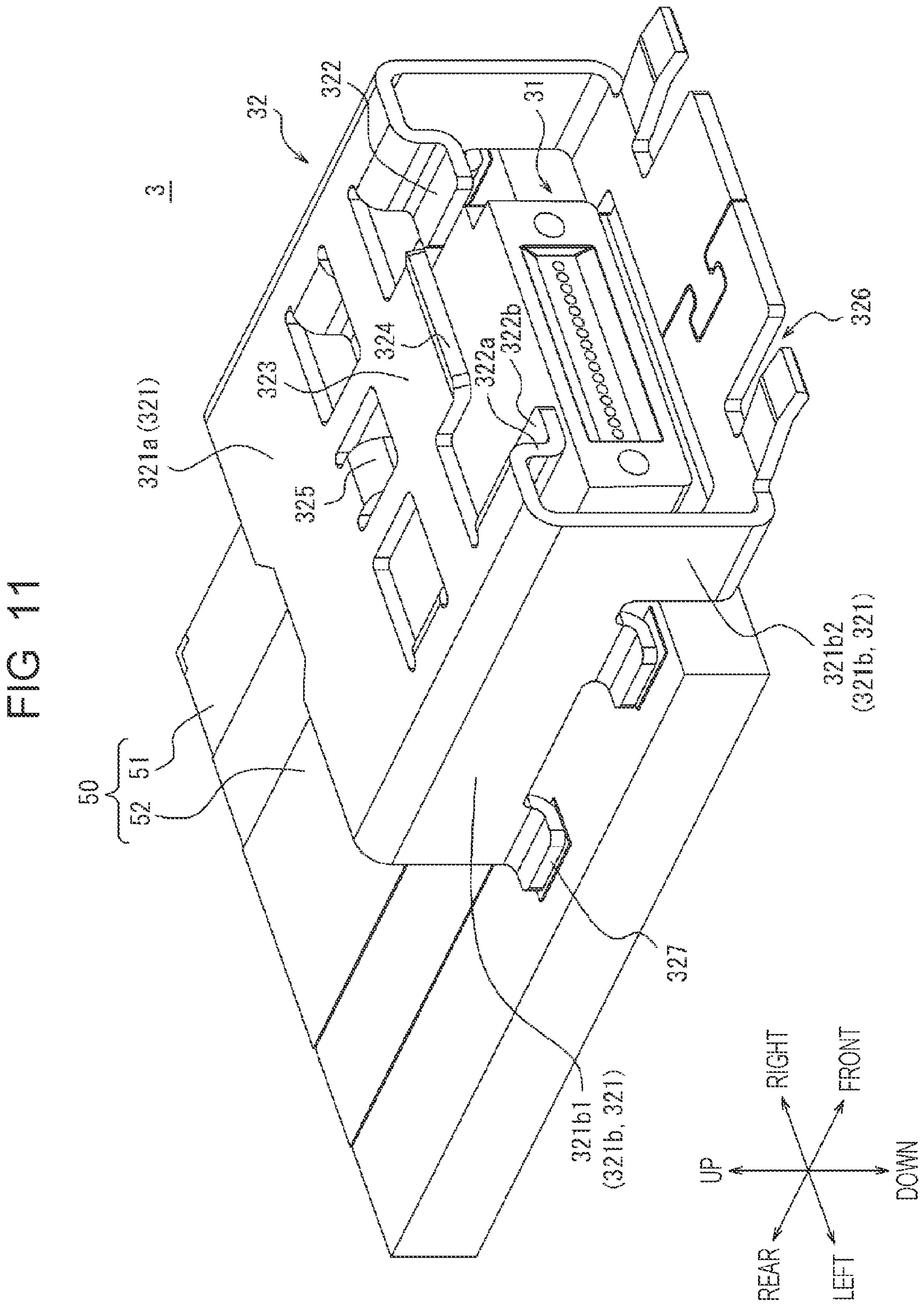
FIG. 11 is a downward perspective view of a second optical connector module alone in FIG. 1 attached to the second optical transmission line.
Figure 12:
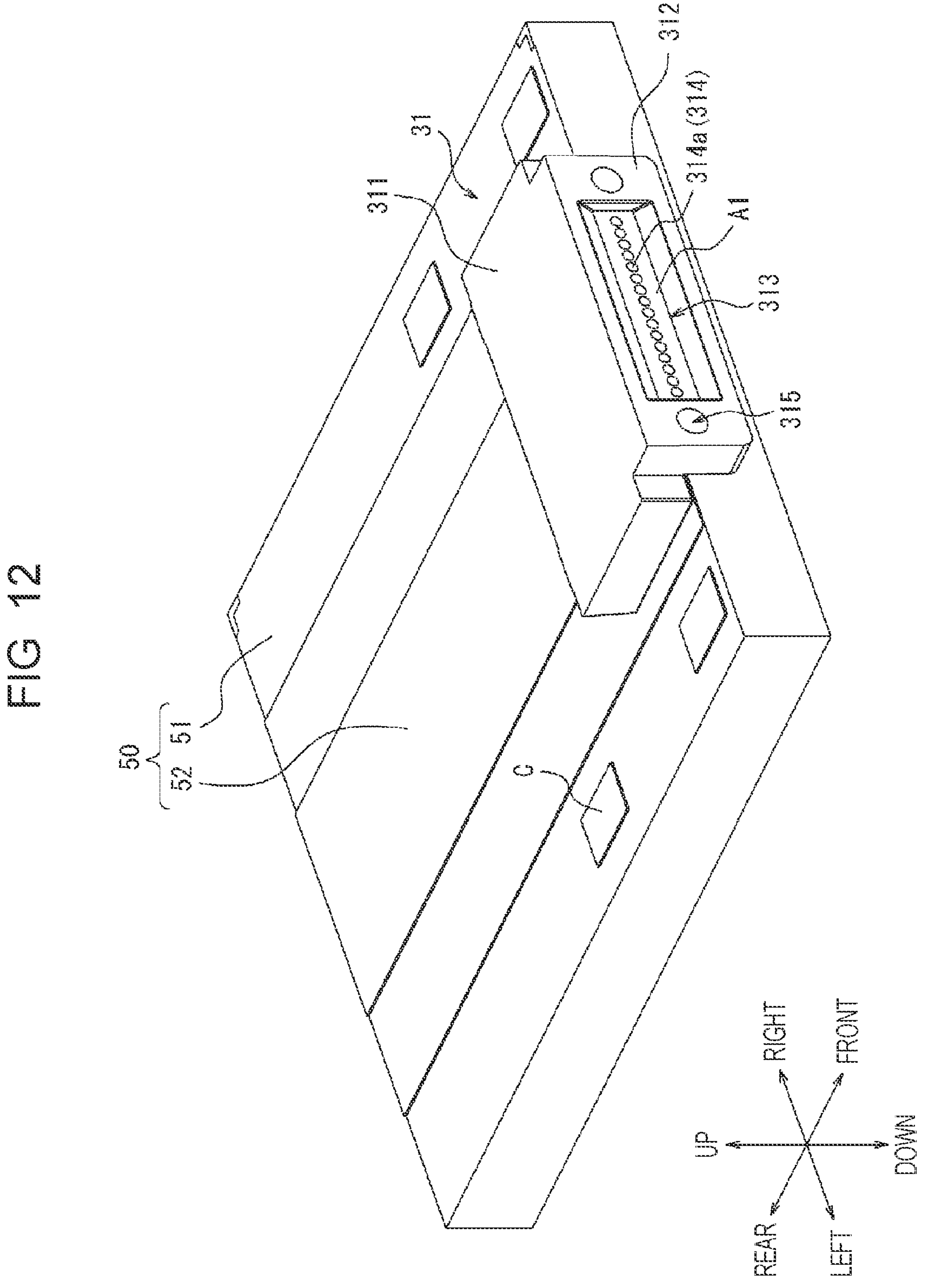
FIG. 12 is a downward perspective view of a second optical connector with a casing in FIG. 11 removed.

FIG. 11 is a downward perspective view of the second optical connector module 3 alone in FIG. 1 attached to the second optical transmission line 50. FIG. 12 is a downward perspective view of the second optical connector 31 with a casing 32 in FIG. 11 removed. An exemplary configuration of the second optical connector module 3 will be mainly described with reference to FIGS. 11 and 12.

The second optical connector module 3 includes the second optical connector 31, which is attached to the second optical transmission line 50 including the substrate 51 and the second optical waveguide portion 52 stacked on the substrate 51 and is mated with the first optical connector 21. The second optical connector module 3 includes the casing 32, which is located apart from the second optical connector 31 and is attached to the substrate 51.

The second optical connector 31 is made of, for example, a light-transmissive resin material, and is L-shaped. The second optical connector 31 is made of a material having a refractive index close to that of the cores 521 in the second optical waveguide portion 52.

The second optical connector 31 includes a first base 311 extending in the front-rear direction. The second optical connector 31 includes a second base 312 protruding forward from the first base 311. The second base 312 protrudes forward from the first base 311 and is formed integrally with the first base 311. The second base 312 extends downward from the first base 311. Once the second optical connector 31 is attached to the second optical transmission line 50, the second base 312 faces the substrate 51 of the second optical transmission line 50 in the mating direction.

The second optical connector 31 includes a cutout 313, which is formed by cutting an outer surface, or front face, of the second base 312 up to a first side face A1. The cutout 313 is formed as a recess.

The second optical connector 31 includes a second lens unit 314 located in the first side face A1 constituting part of the cutout 313. The second lens unit 314 includes multiple second lenses 314*a* arranged in a single row in the left-right direction. A pitch of the multiple second lenses 314*a* in the left-right direction substantially matches the pitch of the cores 521 in the second optical waveguide portion 52 of the second optical transmission line 50, to which the second optical connector module 3 is attached, in the left-right direction. The second lens unit 314 is made of a light-transmissive resin material.

The second optical connector 31 includes through-holes 315, which are located in opposite sides of the second base 312 in the left-right direction and extend through the second base 312 in the front-rear direction. The two through-holes 315 are located at opposite sides of the single row of the multiple second lenses 314*a* in the left-right direction to sandwich the multiple second lenses 314*a* therebetween in the left-right direction. The through-holes 315 are cylindrical and have a circular cross-sectional shape.

The casing 32 is formed as, for example, a fitting. The casing 32 is formed by shaping a sheet of any metallic material into a form illustrated in FIG. 11 with a progressive die (stamping). The method of forming the casing 32 includes, after stamping, bending a workpiece in a direction along the thickness of the workpiece. The method of forming the casing 32 is not limited to this example. The method may include a stamping-based step alone.

The casing 32 includes a base 321 covering the second optical connector 31. The base 321 covers, from above and the opposite sides in the left-right direction, the second optical connector 31 attached to the second optical transmission line 50. The base 321 includes a ceiling portion 321*a* and side wall portions 321*b*. The ceiling portion 321*a* covers the second optical connector 31 from above. The side wall portions 321*b* are located at opposite sides of the ceiling portion 321*a* in the left-right direction and extend downward from the ceiling portion 321*a*. The side wall portions 321*b* are L-shaped in side view in the left-right direction. The side wall portions 321*b* each include a first side wall part 321*b*1, which is located on the substrate 51 and covers the first base 311 of the second optical connector 31 from outside in the left-right direction. The side wall portions 321*b* each include a second side wall part 321*b*2, which protrudes forward from the first side wall part 321*b*1 and is formed integrally with the first side wall part 321*b*1. The second side wall part 321*b*2 extends downward from the first side wall part 321*b*1. The second side wall part 321*b*2 is located in front of an end face of the substrate 51 and covers the second base 312 of the second optical connector 31 from outside in the left-right direction. Once the second optical connector 31 is attached to the second optical transmission line 50, the second side wall part 321*b*2 faces the substrate 51 of the second optical transmission line 50 in the mating direction.

A leading end of the ceiling portion 321*a* in the mating direction is located closer to the first optical connector module 2 than a leading end of the second optical connector 31 in the mating direction. Similarly, a leading end of each of the side wall portions 321*b* in the mating direction is located closer to the first optical connector module 2 than the leading end of the second optical connector 31 in the mating direction.

The casing 32 includes a first supporting portion 322 located remoter from the substrate 51 than the second optical connector 31. The first supporting portion 322 extends toward the substrate 51 from the ceiling portion 321*a*, which is located remote from the substrate 51 and faces the second optical connector 31, of the base 321 while being bent. The first supporting portion 322 extends downward from the ceiling portion 321*a* while being bent or cranked. The first supporting portion 322 includes a first part 322*a* and a second part 322*b*. The first part 322*a* extends downward from the ceiling portion 321*a* while being bent. The second part 322*b* extends inward from the first part 322*a* in the left-right direction while being further bent. Multiple first supporting portions 322 are spaced apart from each other in the mating direction. Multiple first supporting portions 322 are spaced apart from each other in the direction orthogonal to the mating direction. The casing 32 includes four first supporting portions 322 spaced apart from each other in the front-rear and left-right directions.

The casing 32 includes a reinforcing portion 323, which is included in the ceiling portion 321*a* of the base 321 and is located between one of the first supporting portions 322 spaced apart from each other in the mating direction and another adjacent first supporting portion 322. The reinforcing portion 323 extends across the ceiling portion 321*a* in the left-right direction. The casing 32 includes a guiding portion 324, which protrudes from the reinforcing portion 323 toward the first optical connector module 2 and includes a leading end located adjacent to the first optical connector module 2 that extends obliquely away from the substrate 51. The leading end of the guiding portion 324 extends obliquely upward and forward.

The casing 32 includes a locking portion 325, which is located in a central part of the ceiling portion 321*a* and linearly extends downward. The casing 32 includes a second supporting portion 326, which is located closer to the substrate 51 than the second optical connector 31 and is configured to support the first optical connector module 2 in a direction away from the substrate 51. The second supporting portion 326 protrudes forward from lower ends of the second side wall parts 321*b*2. The second supporting portion 326 extends across the casing 32 in the left-right direction. The second supporting portion 326 couples one of the second side wall parts 321*b*2 spaced apart from each other in the left-right direction to the other second side wall part 321*b*2. A leading end of the second supporting portion 326 in the mating direction is located closer to the first optical connector module 2 than a leading end of the base 321 in the mating direction.

As described above, a leading end of the casing 32 is located closer to the first optical connector module 2 than a leading end of the second optical connector 31 in the mating direction.

The casing 32 includes a mounting portion 327, which extends outward from a lower end of the first side wall part 321*b*1 in the left-right direction. Multiple mounting portions 327 are spaced apart from each other in the mating direction. Multiple mounting portions 327 are spaced apart from each other in the direction orthogonal to the mating direction. The casing 32 includes four mounting portions 327 spaced apart from each other in the front-rear and left-right directions.

For the casing 32 with the above-described structure, the mounting portions 327 are soldered to circuit patterns C formed on a mounting face of the substrate 51. The mounting portions 327 are mounted on the substrate 51 in the above-described manner, so that the casing 32 is mounted on the substrate 51. On the mounting face of the substrate 51, different parts from the second optical connector 31 and the casing 32, for example, a semiconductor chip and a heat sink, are mounted.

The casing 32 is placed on a soldering paste on the circuit patterns C such that the casing 32 is shifted forward by a distance corresponding to, for example, half the width of the mounting portion 327 in the front-rear direction. At this time, the position of each of the mounting portions 327 relative to a respective one of the circuit patterns C in the front-rear direction is shifted forward from the middle of the circuit pattern C by substantially half the width of the mounting portion 327 in the front-rear direction. The position of each of the second side wall parts 321*b*2 relative to a front end face of the substrate 51 in the front-rear direction is shifted forward from a position where the second side wall part 321*b*2 is in complete contact with the front end face of the substrate 51 by substantially half the width of the mounting portion 327 in the front-rear direction. When solder in such a state is melted by reflowing, the surface tension of the solder causes the mounting portion 327 placed on the soldering paste to naturally move to a position where forces are balanced, so that the casing 32 is accurately moved to a predetermined position relative to the substrate 51. At this time, the mounting portion 327 is moved to the middle of the circuit pattern C in the front-rear direction. The second side wall part 321*b*2 is moved to the position where the second side wall part 321*b*2 is in complete contact with the front end face of the substrate 51.

Under the same conditions including the amount and arrangement of solder applied to the circuit patterns C on the substrate 51 as described above, the same intended placement of the casing 32 on the substrate 51 can be achieved repeatedly. The casing 32 can be accurately positioned and fixed such that the second side wall parts 321*b*2 are in complete contact with the front end face of the substrate 51.

Once the second optical connector module 3 is assembled in the above-described manner, the second optical connector 31 is disposed on the second optical transmission line 50 without being in contact with the casing 32. More specifically, an upper surface of the second optical connector 31 is located apart from the ceiling portion 321*a* of the casing 32, the first supporting portions 322, and the locking portion 325. Opposite sides of the second optical connector 31 in the left-right direction are located apart from the side wall portions 321*b* of the casing 32.

Figure 13:
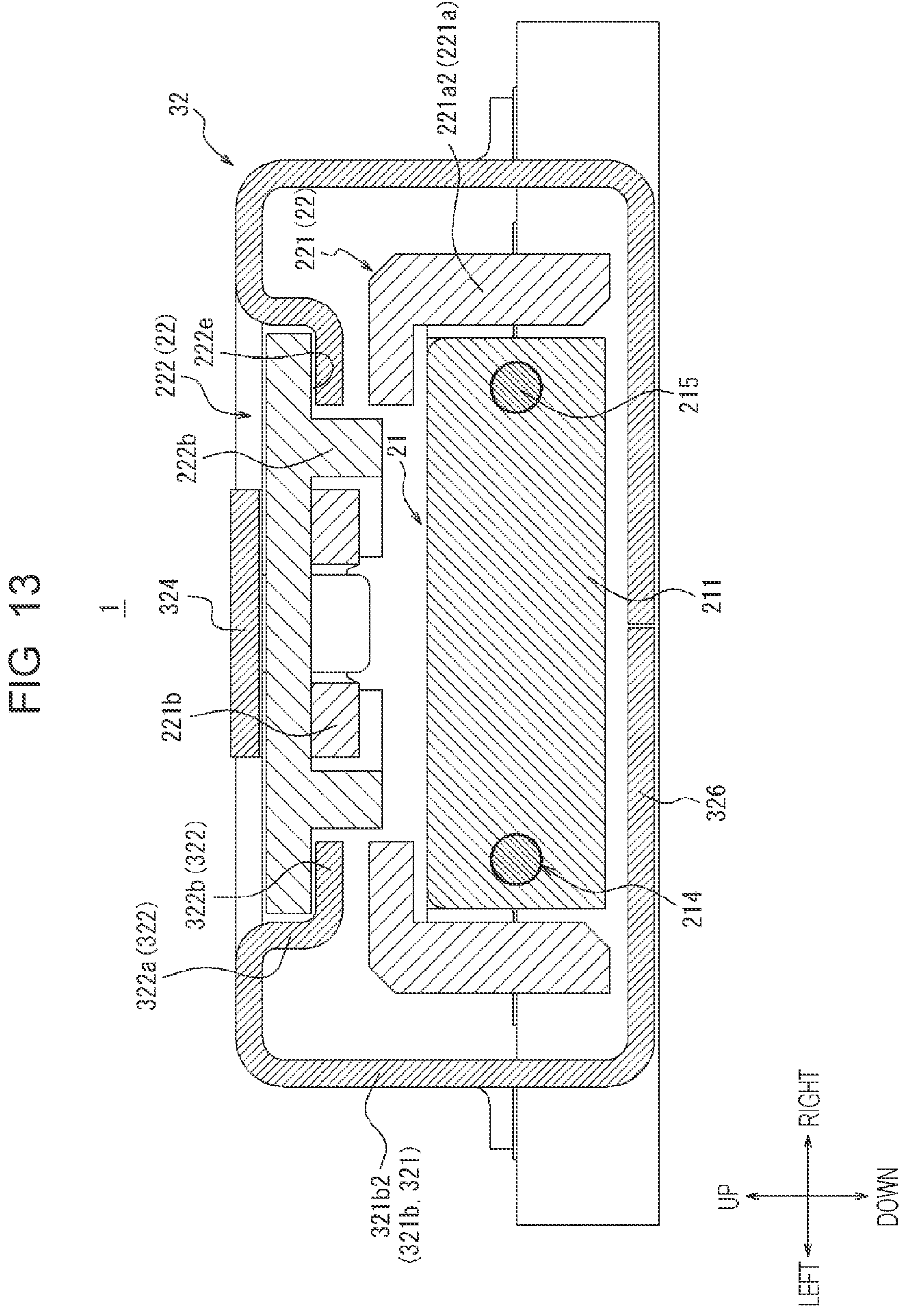
FIG. 13 is a cross-sectional view taken along arrow line XIII-XIII in FIG. 1.
Figure 14:
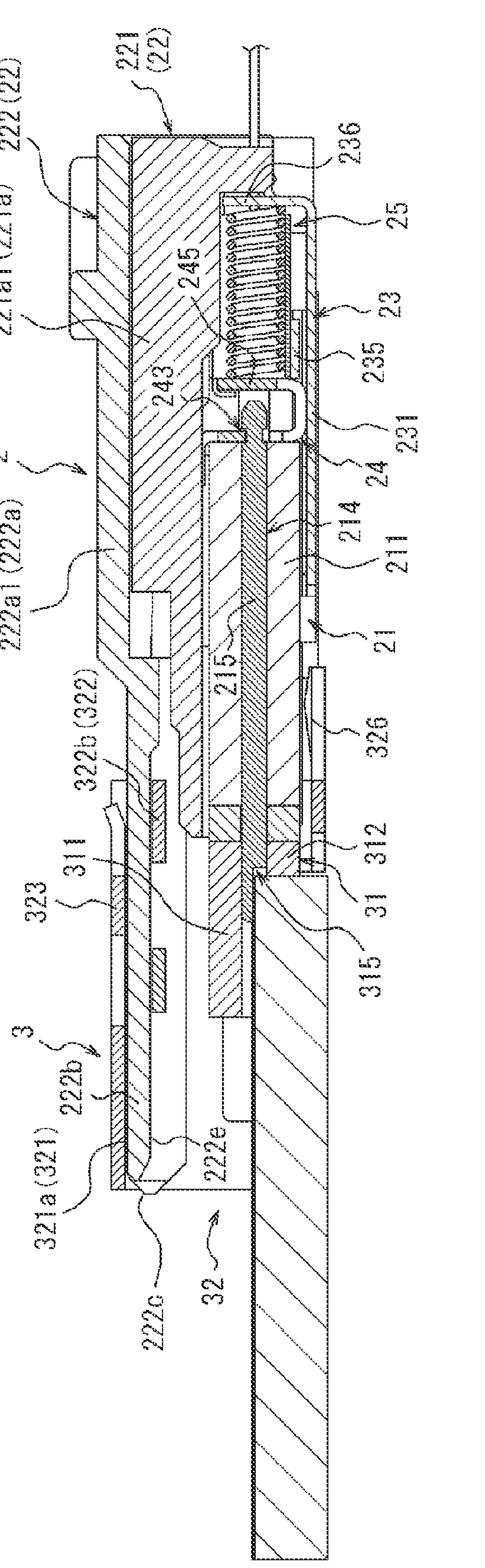
FIG. 14 is a sectional view taken along arrow line XIV-XIV in FIG. 1.
Figure 14:
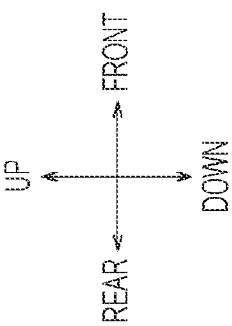
Figure 15:
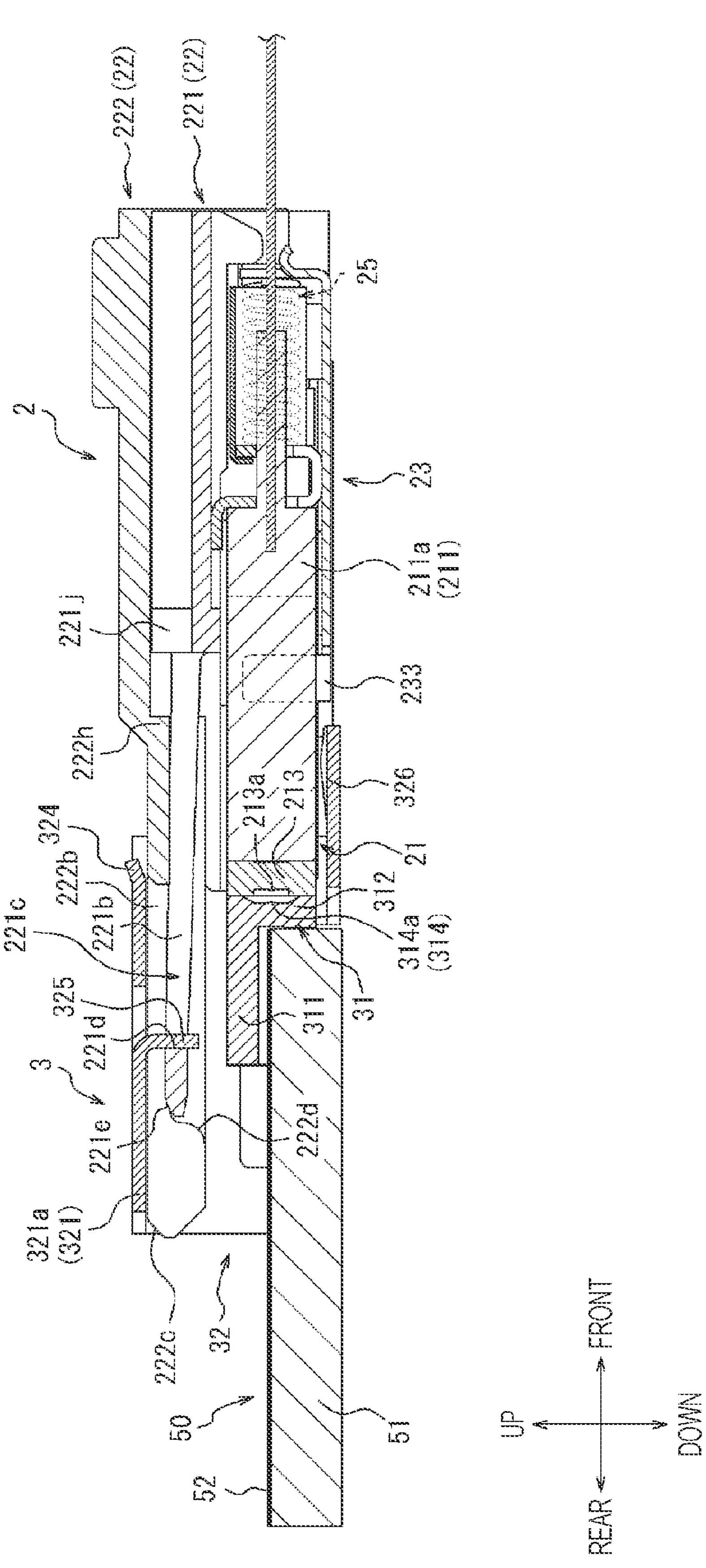
FIG. 15 is a sectional view taken along arrow line XV-XV in FIG. 1.

FIG. 13 is a cross-sectional view taken along arrow line XIII-XIII in FIG. 1. FIG. 14 is a sectional view taken along arrow line XIV-XIV in FIG. 1. FIG. 15 is a sectional view taken along arrow line XV-XV in FIG. 1. The configuration and functions of the optical connector system 1 in the mated state will be mainly described with reference to FIGS. 13 to 15.

To mate the first optical connector module 2 with the second optical connector module 3, as illustrated in FIG. 2, the protrusion 222*b*, which is the closest part of the first optical connector module 2 to the second optical connector module 3, of the housing 22 is first inserted into the casing 32. Thus, the position of the first optical connector 21 relative to the second optical connector 31 is roughly determined.

At this time, the guiding portion 324 of the casing 32 guides the protrusion 222*b*, which is inserted horizontally or from obliquely above, into the casing 32. For example, a leading end of the guiding portion 324 that extends obliquely upward is brought into contact with the guiding faces 222*c* at the rear or leading end of the protrusion 222*b*, so that the protrusion 222*b* is guided into the casing 32. The guiding portion 324 of the casing 32 and the ceiling portion 321*a* reduce upward detachment of the protrusion 222*b* from the casing 32 during insertion.

The first supporting portions 322 of the casing 32 support the supported portions 222*e* of the protrusion 222*b* of the housing 22 in the direction away from the substrate 51. More specifically, the second parts 322*b* of the first supporting portions 322 of the casing 32 receive the supported portions 222*e* of the protrusion 222*b*, which are inserted horizontally or from obliquely above. The second parts 322*b* of the first supporting portions 322 keep the protrusion 222*b* from touching the second optical connector 31 and the substrate 51, which are located below the first supporting portions 322. In addition, both the first parts 322*a* and the second parts 322*b* of the first supporting portions 322 guide and allow the protrusion 222*b* to move further rearward.

The guiding portion 324 and the ceiling portion 321*a* restrict upward movement of the protrusion 222*b*, and the first supporting portions 322 restrict downward movement of the protrusion 222*b*. Thus, the first optical connector module 2 is attitude-controlled so that the first optical connector module 2 is substantially horizontal to the second optical connector module 3. The two first supporting portions 322 located at the opposite sides of the protrusion 222*b* in the left-right direction, more specifically, side faces of the first parts 322*a* in the left-right direction restrict outward movement of the protrusion 222*b* in the left-right direction. Thus, the first optical connector module 2 is attitude-controlled while being kept from skewing relative to the second optical connector module 3 in the left-right direction.

As illustrated in FIG. 15, as the protrusion 222*b* further moves rearward, the leading end face 221*e* of the protrusion 221*b* of the first housing 221 comes into contact with the locking portion 325 of the casing 32. Since the leading end face 221*e* is rounded, the protrusion 221*b* is elastically deformed downward as the protrusion 221*b* further moves rearward. Thus, the protrusion 221*b* moves beyond the locking portion 325, so that the locked portion 221*c* located in the protrusion 221*b* engages the locking portion 325. At this time, the locked face 221*d* of the locked portion 221*c* is located rearward of and in contact with a rear face of the locking portion 325. The first optical connector module 2 is completely mated with the second optical connector module 3 in the above-described manner. A locking structure including the locked portion 221*c* and the locking portion 325 is located in only one end portion of the optical connector system 1 that is located remote from the substrate 51.

In the mated state in which the first optical connector module 2 and the second optical connector module 3 are mated with each other, as illustrated in FIG. 14, the first optical connector 21 and the second optical connector 31 are mated with each other. More specifically, the pins 215 of the first optical connector 21 extend through the through-holes 315 of the second optical connector 31. Thus, the first optical connector 21 is accurately positioned relative to the second optical connector 31. As illustrated in FIG. 15, the first lens unit 213 of the first optical connector 21 is placed against the second base 312 of the second optical connector 31. Thus, each of the first lenses 213*a* faces a respective one of the second lenses 314*a* in the mating direction.

Referring to FIG. 10, in the first optical connector module 2 in the unmated state, the first extending portions 233 of the first fitting 23 are in contact with the wide portion 211*a* of the first optical connector 21 in the front-rear direction. On the other hand, referring to FIG. 15, in the first optical connector module 2 in the mated state, the first extending portions 233 of the first fitting 23 are apart from the wide portion 211*a* of the first optical connector 21 in the front-rear direction. More specifically, the first fitting 23 is shifted rearward relative to the first optical connector 21 for the mated state, thus further compressing the coil springs 25. The compression of the coil springs 25 produces a strong restoring force, which causes the first optical connector 21 to be placed against the second optical connector 31 and be stably fastened. In addition, the second supporting portion 326 of the casing 32 supports, from below, the first optical connector 21 to bear the weight of the first optical connector module 2.

To unmate the first optical connector module 2 from the second optical connector module 3 in the above-described mated state, the second housing 222 of the first optical connector module 2 is first pulled forward. As the second housing 222 is moved forward, contact between the leading end face 221*e* of the protrusion 221*b* and the curved faces 222*d* of the protrusion 222*b* causes the leading end face 221*e* to move downward along the curved faces 222*d*, so that the protrusion 221*b* is elastically deformed downward. This causes the locked portion 221*c* to disengage from the locking portion 325, thus allowing forward movement of the first housing 221.

When the second housing 222 is further moved forward, the protruding wall 222*h* of the second housing 222 comes into contact with the second protruding walls 221*j* of the first housing 221. Such contact between the protruding wall of the second housing 222 and these protruding walls causes the first housing 221 to move forward together with the second housing 222. Thus, the first optical connector module 2 is completely unmated from the second optical connector module 3.

The optical connector system 1 according to the above-described embodiment allows accurate alignment of the optical transmission lines and exhibits improved ease of mating in the optical connector system 1. In the optical connector system 1, the leading end of the housing 22 is located closer to the second optical connector module 3 than the leading end of the first optical connector 21 in the mating direction. Similarly, the leading end of the casing 32 is located closer to the first optical connector module 2 than the leading end of the second optical connector 31. Thus, the housing 22 is likely to first come into contact with the casing 32 when the first optical connector module 2 is mated with the second optical connector module 3.

Therefore, one of the first lens unit 213 and the second lens unit 314 is less likely to come into contact with the optical connector module including the other lens unit. One of the first optical connector 21 and the second optical connector 31 is less likely to come into contact with the optical connector module including the other optical connector. This reduces breakage of the optical components, thus maintaining optical transmission characteristics in the optical connector system 1. In the optical connector system 1, if a relative position of the first optical connector module 2 is not accurately aligned with that of the second optical connector module 3 during mating, contact between the housing 22 and the casing 32 facilitates mating of the connector modules without breakage of the optical components. This increases tolerance to misalignment of the first optical connector module 2 relative to the second optical connector module 3, leading to improved ease of mating in the optical connector system 1.

In the first optical connector module 2, the housing 22 and the first optical connector 21 are not in contact with each other and are apart from each other. Thus, the first optical connector 21 is insusceptible to an external force acting on the housing 22 in the first optical connector module 2. Similarly, in the second optical connector module 3, the casing 32 and the second optical connector 31 are not in contact with each other and are apart from each other. Thus, the second optical connector 31 is insusceptible to an external force acting on the casing 32 in the second optical connector module 3. The optical connector system 1 can reduce the effects of external forces on both the first optical connector 21 and the second optical connector 31. Therefore, the optical connector system 1 can reduce breakage of these optical connectors and maintain the optical transmission characteristics.

The housing 22 includes the protrusion 222*b*. The leading end of the protrusion 222*b* is located closer to the second optical connector module 3 than the leading end of the first optical connector 21 in the mating direction. Thus, the protrusion 222*b* of the housing 22 is likely to first come into contact with the casing 32 when the first optical connector module 2 is mated with the second optical connector module 3. This reduces breakage of the optical components, thus maintaining the optical transmission characteristics in the optical connector system 1. In the optical connector system 1, if the relative position of the first optical connector module 2 is not accurately aligned with that of the second optical connector module 3 during mating, contact between the protrusion 222*b* of the housing 22 and the casing 32 facilitates mating of the connector modules without breakage of the optical components. This increases the tolerance to misalignment of the first optical connector module 2 relative to the second optical connector module 3, leading to improved ease of mating in the optical connector system 1.

The casing 32 includes the first supporting portions 322. The leading end of the housing 22 in the mating direction is likely to come into contact with the first supporting portions 322 even when the first optical connector module 2 is inserted, for example, from obliquely above, into the second optical connector module 3. To leave a space for a recent increase in the number of components mounted on an electronic apparatus on which the optical connector system 1 is mounted, the optical connector system 1 is required to have a lower profile.

For example, if the second optical connector 31 and the whole of the second optical connector module 3 are reduced in profile such that their heights from the substrate 51 are lowered, a distance between the first optical connector module 2 and the substrate 51 in the up-down direction during mating will also be reduced. This will lead to a reduction in space in which mating can be performed above the substrate 51. It may be difficult to mate the first optical connector module 2 with the second optical connector module 3 while the first optical connector module 2 is being held horizontal to the second optical connector module 3.

The optical connector system 1 can keep the housing 22 from touching the second optical connector 31 and the substrate 51, which are located below the first supporting portions 322, even when the first optical connector module 2 is inserted, for example, from obliquely above, into the second optical connector module 3. This reduces breakage of the optical components, thus maintaining the optical transmission characteristics in the optical connector system 1. In addition, the first supporting portions 322 facilitate further rearward movement of the housing 22. This leads to improved ease of mating in guiding the first optical connector module 2 rearward.

The casing 32 includes the multiple first supporting portions 322 spaced apart from each other in the mating direction. This further facilitates rearward movement of the housing 22 as compared with a case where the first supporting portions 322 are located only at the front end of the casing 32. This leads to further improved ease of mating in guiding the first optical connector module 2 rearward.

Each of the first supporting portions 322 extends from the ceiling portion 321*a* toward the substrate 51 while being bent. Thus, the impact of contact between the housing 22 and the first supporting portion 322 during mating can be received by the ceiling portion 321*a* via the first supporting portion 322. Thus, the second optical connector 31 is more insusceptible to an external force acting on the ceiling portion 321*a* of the casing 32. The optical connector system 1 can more stably protect the optical components, such as the second optical connector 31.

The first supporting portions 322 extend downward from the ceiling portion 321*a* while being bent or cranked. This allows the housing 22 and the whole of the first optical connector module 2 to be maintained horizontally when the housing 22 is guided rearward. The optical connector system 1 facilitates attitude control of the first optical connector module 2 during mating.

The casing 32 includes the reinforcing portion 323. This enhances the strength of the ceiling portion 321*a* of the casing 32. This leads to enhanced strength of the entire casing 32. Thus, the impact of contact between the housing 22 and the first supporting portions 322 during mating can be more stably received by the ceiling portion 321*a* via the first supporting portions 322. Thus, the second optical connector 31 is more insusceptible to an external force acting on the ceiling portion 321*a* of the casing 32. The optical connector system 1 can more stably protect the optical components, such as the second optical connector 31.

The casing 32 includes the guiding portion 324. This allows the housing 22 to be easily guided into the casing 32 even when the first optical connector module 2 is inserted from obliquely above into the second optical connector module 3. This leads to improved ease of mating of the first optical connector module 2 with the second optical connector module 3.

The housing 22 includes the supported portions 222*e*, serving as stepped portions. This allows the first supporting portions 322 to be placed in a space between a level of the surface of each of the supported portions 222*e* facing toward the substrate 51 and a level of the surface of the protrusion 222*b* facing toward the substrate 51. As illustrated in FIG. 13, the thickness of each of the first supporting portions 322 in the up-down direction is received in the space between the level of the surface of the supported portion 222*e* facing toward the substrate 51 and the level of the surface of the protrusion 222*b* facing toward the substrate 51. Therefore, the profile of the casing 32 can be lowered by an amount corresponding to the thickness of the casing 32. The profile of the entire second optical connector module 3 can also be lowered.

The locking structure including the locked portion 221*c* and the locking portion 325 is located in only one end portion of the optical connector system 1 located remote from the substrate 51. This allows the profile of the entire optical connector system 1 to be lowered.

The casing 32 includes the second supporting portion 326. This allows the first optical connector 21 mated with the second optical connector 31 to be stably supported upward. The second supporting portion 326 can horizontally maintain the first optical connector module 2 to keep the first optical connector module 2 from being inclined forward and obliquely downward due to, for example, the weight of the first optical connector module 2 and the weight of the first optical transmission line 40. Therefore, the mated state between the first optical connector module 2 and the second optical connector module 3 is stably maintained. This leads to improved reliability of the optical connector system 1, serving as a product.

In the optical connector system 1, the first optical connector module 2 can be easily unmated from the second optical connector module 3 by pulling the second housing 222 of the first optical connector module 2 forward. This leads to improved ease of unmating as well as improved ease of mating. On the other hand, engagement between the locked portion 221*c* and the locking portion 325 can maintain the mated state between the first optical connector 21 and the second optical connector 31 even if the first optical transmission line 40 is pulled forward in the mated state. Therefore, the first optical connector 21 and the second optical connector 31 in the mated state are insusceptible to an external force acting on the first optical transmission line 40.

The surface tension of solder causes each mounting portion 327 placed on soldering paste to naturally move to a position where forces are balanced, so that the casing 32 is accurately moved to a predetermined position relative to the substrate 51. Complete contact between each second side wall part 321*b*2 and the front end face of the substrate 51 can reduce or eliminate misalignment and skewing of the second optical connector 31 relative to the substrate 51.

Once the first optical connector module 2 is attached to the first optical transmission line 40, the extending portions 221*i* of the first housing 221 are located directly above and outside the first optical transmission line 40, held by the first optical connector 21, in the left-right direction. Similarly, the second bent portion 237 of the first fitting 23 is located directly below the first optical transmission line 40 held by the first optical connector 21. As described above, the first optical transmission line 40 is surrounded by the extending portions 221*i* and the second bent portion 237 in the up-down and left-right directions. Thus, if the first optical transmission line 40, including the optical fibers, experiences an external force and undulates in the up-down and left-right directions, the impact of such undulation can be received by the housing 22. Therefore, the optical connector system 1 can reduce or eliminate a likelihood that a load caused by undulation of the first optical transmission line 40 including the optical fibers may be applied to the first optical connector 21.

It will be apparent to those skilled in the art that the present disclosure can be implemented in other specific forms in addition to the above-described embodiment without departing from the spirit or essential features of the present disclosure. Therefore, the above description is illustrative and is not restrictive. The scope of the present disclosure is defined by the appended claims, rather than the foregoing description. Some variations that are within the range of equivalents of all variations are intended to be encompassed within the scope of the present disclosure.

For example, the shape, placement, and orientation of each component described above and the number of components are not limited to those illustrated in the above description and the figures. Any number of components having any shape, placement, and orientation may be used as long as the function of the component can be achieved.

Although the housing 22 includes the first housing 221 and the second housing 222 in the above-described embodiment, the configuration is not limited to this example. The housing 22 may include only one housing or may include three or more housings.

Although the leading end of the protrusion 222*b* is located closer to the second optical connector module 3 than the leading end of the first optical connector 21 in the mating direction in the above-described embodiment, the configuration is not limited to this example. The leading end of the housing 22 located closer to the second optical connector module 3 than the leading end of the first optical connector 21 may be a part of any other structure rather than a protruding structure like the protrusion 222*b*.

Although the casing 32 is formed as a fitting in the above-described embodiment, the configuration is not limited to this example. The casing 32 may be made of any resin material instead of a metallic material.

Although the casing 32 includes the first supporting portion 322 in the above-described embodiment, the configuration is not limited to this example. The casing 32 does not need to include a supporting structure like the first supporting portion 322.

Although the casing 32 includes the multiple first supporting portions 322 spaced apart from each other in the mating direction in the above-described embodiment, the configuration is not limited to this example. The first supporting portions 322 may be located only at the front end of the casing 32 or may linearly and continuously extend across the casing 32 in the front-rear direction.

Although each first supporting portion 322 extends from the ceiling portion 321*a* toward the substrate 51 while being bent in the above-described embodiment, the configuration is not limited to this example. The first supporting portion 322 may extend from the side wall portion 321*b*. In this case, the casing 32 may include no ceiling portion 321*a* and two side wall portions 321*b* spaced apart in the left-right direction.

In the above-described embodiment, the casing 32 includes the reinforcing portion 323 located between one of the first supporting portions 322 spaced apart from each other in the mating direction and another adjacent first supporting portion 322. The configuration is not limited to this example. The casing 32 may include no reinforcing portion 323. Conversely, the casing 32 may be formed such that the ceiling portion 321*a* is a single continuous flat plate.

In the above-described embodiment, the casing 32 includes the guiding portion 324, and the leading end of the guiding portion 324 adjacent to the first optical connector module 2 extends obliquely away from the substrate 51. The configuration is not limited to this example. The leading end of the guiding portion 324 may extend horizontally instead of extending obliquely away from the substrate 51. The casing 32 may include no guiding portion 324.

In the above-described embodiment, the surfaces of the supported portions 222*e* of the housing 22 facing toward the substrate 51 are located remoter from the substrate 51 than the surface of the protrusion 222*b* facing toward the substrate 51. The configuration is not limited to this example. The protrusion 222*b* may include lower surface portions that are flush with each other instead of including stepped lower surface portions.

In the above-described embodiment, the casing 32 includes the second supporting portion 326, which is located closer to the substrate 51 than the second optical connector 31 and supports the first optical connector module 2 in the direction away from the substrate 51. The configuration is not limited to this example. The casing 32 may include no second supporting portion 326.

In the above-described embodiment, the leading end of the second supporting portion 326 in the mating direction is located closer to the first optical connector module 2 than the leading end of the base 321 in the mating direction. The configuration is not limited to this example. The leading end of the casing 32 in the mating direction may be located at an end of the casing 32 that is located remote from the substrate 51 instead of at the second supporting portion 326. The leading end of the casing 32 in the mating direction may be located in the ceiling portion 321*a* of the base 321.

In this case, the second supporting portion 326 is located further on the second-optical-connector-module-3 side than the leading end of the ceiling portion 321*a* in the mating direction and is configured to guide, on the substrate-51 side, the first optical connector module 2. When the first optical connector module 2 is mated with the second optical connector module 3, the second supporting portion 326 is located further rearward than the front end of the ceiling portion 321*a* and guides, on the lower side, the first optical connector module 2 into the casing 32.

Figure 16:
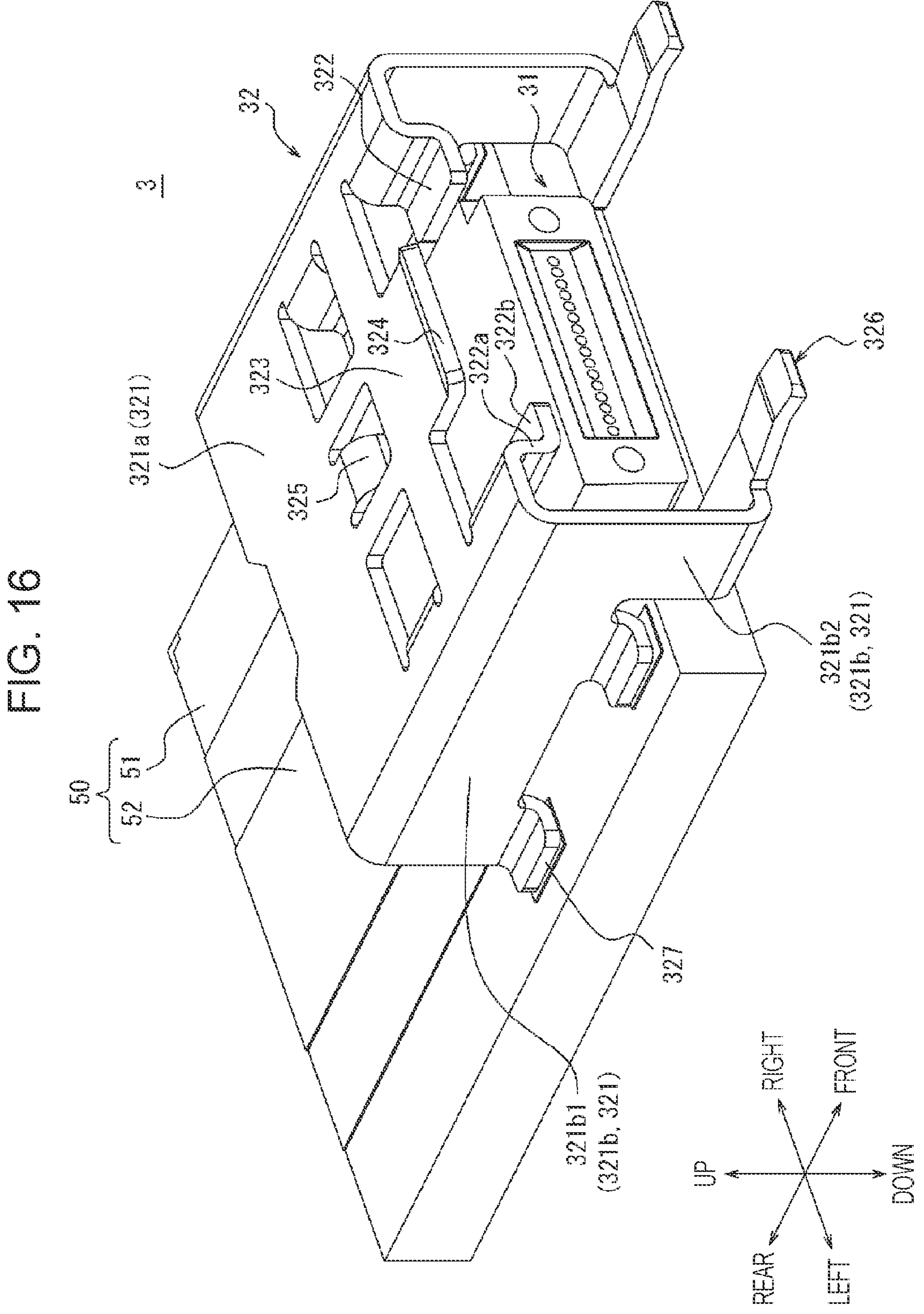
FIG. 16 is a downward perspective view, which is equivalent to FIG. 11, of a second optical connector module alone in an alternative embodiment.

FIG. 16 is a downward perspective view, which is equivalent to FIG. 11, of a second optical connector module 3 alone in an alternative embodiment. In the above-described embodiment, the second supporting portion 326 extends across the casing 32 in the left-right direction, as illustrated in FIG. 11. The configuration is not limited to the above example. As illustrated in FIG. 16, the second supporting portion 326 may protrude in the mating direction from each of the opposite ends of the casing 32 in the left-right direction.

Although the casing 32 includes the four mounting portions 327 in the above-described embodiment, the configuration is not limited to this example. The number of mounting portions 327 included in the casing 32 may be any number other than four.

In the above-described embodiment, the locking structure including the locked portion 221*c* and the locking portion 325 is located in only one end portion of the optical connector system 1 located remote from the substrate 51. The configuration is not limited to this example. The housing 22 may include at least one locked portion 221*c*. The casing 32 may include at least one locking portion 325 to engage the locked portion 221*c*. At least one locking structure including the locked portion 221*c* and the locking portion 325 may be located in an end portion of the optical connector system 1 that is located at a position other than on the substrate-51 side.

For example, as illustrated in FIG. 15, only one locking structure including the locked portion 221*c* and the locking portion 325 is located in an end portion of the optical connector system 1 that is located remote from the substrate 51. The configuration is not limited to this example. At least one locking structure may be located in an end portion of the optical connector system 1 in the left-right direction instead of in the end portion thereof located remote from the substrate 51.

For example, at least one locking portion 325 may extend inward from the side wall portion 321*b* in the left-right direction instead of extending from the ceiling portion 321*a* of the casing 32. At least one locking portion 325 may be included in each of the side wall portions 321*b* on the opposite sides in the left-right direction instead of being included in the ceiling portion 321*a*. At least one locking portion 325 may be included in either one of the side wall portions 321*b* on the opposite sides in the left-right direction instead of being included in the ceiling portion 321*a*. For the position of the locking portion 325 in the side wall portion 321*b*, the locking portion 325 may be included in at least one of the first side wall part 321*b*1 or the second side wall part 321*b*2.

The locked portion 221*c* may be formed at a corresponding position in the housing 22 to engage the locking portion 325 in the mated state. Instead of one locked portion 221*c* included in the protrusion 221*b* of the first housing 221, for example, at least one locked portion 221*c* may be included in the side wall portion 222*a*2 of the second housing 222. At least one locked portion 221*c* may be included in each of the side wall portions 222*a*2 on the opposite sides in the left-right direction. At least one locked portion 221*c* may be included in either one of the side wall portions 222*a*2 on the opposite sides in the left-right direction.

One locking structure may be located in an end portion of the optical connector system 1 that is located remote from the substrate 51, and at least one locking structure may be located in an end portion of the optical connector system 1 in the left-right direction.

For example, in addition to one locking portion 325 included in the ceiling portion 321*a* of the casing 32, at least one locking portion 325 may extend inward from the side wall portion 321*b* in the left-right direction. In addition to one locking portion 325 included in the ceiling portion 321*a*, at least one locking portion 325 may be included in each of the side wall portions 321*b* on the opposite sides in the left-right direction. In addition to one locking portion 325 included in the ceiling portion 321*a*, at least one locking portion 325 may be included in either one of the side wall portions 321*b* on the opposite sides in the left-right direction. For the position of the locking portion 325 in the side wall portion 321*b*, the locking portion 325 may be included in at least one of the first side wall part 321*b*1 or the second side wall part 321*b*2.

The locked portion 221*c* may be formed at a corresponding position in the housing 22 to engage the locking portion 325 in the mated state. For example, in addition to one locked portion 221*c* included in the protrusion 221*b* of the first housing 221, at least one locked portion 221*c* may be included in the side wall portion 222*a*2 of the second housing 222. In addition to one locked portion 221*c* included in the protrusion 221*b*, at least one locked portion 221*c* may be included in each of the side wall portions 222*a*2 on the opposite sides in the left-right direction. In addition to one locked portion 221*c* included in the protrusion 221*b*, at least one locked portion 221*c* may be included in either one of the side wall portions 222*a*2 on the opposite sides in the left-right direction.

Although one first optical connector module 2 is mated with one casing 32 in the above-described embodiment, the configuration is not limited to this example. The optical connector system 1 may be configured such that one casing 32 mates with multiple first optical connector modules 2. For example, the casing 32 may mate with multiple first optical connector modules 2 arranged in the left-right direction.

Although the second optical waveguide portion 52 is located on the upper surface of the substrate 51 in the above-described embodiment, the configuration is not limited to this example. For example, the second optical waveguide portion 52 may be embedded in the substrate 51. In this case, the end face of the second optical waveguide portion 52 may coincide with the end face of the substrate 51 such that the end faces of the cores 521 are exposed from the substrate 51.

REFERENCE SIGNS

1 optical connector system
2 first optical connector module
3 second optical connector module
21 first optical connector
211 base
211*a* wide portion
211*b* narrow portion
212 holding portion
213 first lens unit
213*a* first lens

214 through-hole
215 pin
22 housing
221 first housing
221*a* base
221*a*1 ceiling portion
221*a*2 side wall portion
221*b* protrusion
221*c* locked portion
221*d* locked face
221*e* leading end face
221*f* engaging portion
221*g* first protruding wall
221*h* recess
221*i* extending portion
221*j* second protruding wall
222 second housing
222*a* base (first base)
222*a*1 ceiling portion
222*a*2 side wall portion
222*b* protrusion
222*c* guiding face
222*d* curved face
222*e* supported portion
222*f* groove
222*g* engaging portion
222*h* protruding wall
23 first fitting
231 bottom plate
232 engaging portion
232*a* cutout
232*b* first bent portion
233 first extending portion
234 second extending portion
235 supporting portion
236 receiving portion
237 second bent portion
24 second fitting
241 base
242 coupling portion
243 cut
244 supporting portion
245 receiving portion
25 coil spring
26 third fitting
261 ceiling portion
262 bent portion
263 covering portion
31 second optical connector
311 first base
312 second base
313 cutout
314 second lens unit
314*a* second lens
315 through-hole
32 casing
321 base (second base)
321*a* ceiling portion
321*b* side wall portion
321*b*1 first side wall part
321*b*2 second side wall part
322 first supporting portion
322*a* first part
322*b* second part
323 reinforcing portion
324 guiding portion
325 locking portion
326 second supporting portion
327 mounting portion
40 first optical transmission line
41 first optical waveguide portion
50 second optical transmission line
51 substrate
52 second optical waveguide portion
521 core
522 cladding
522*a* first cladding
522*b* second cladding
A1 first side face
C circuit pattern

The invention claimed is:

1. An optical connector system comprising:

a first optical connector module; and a second optical connector module mated with the first optical connector module, the first optical connector module comprising:

a first optical connector attached to a leading end of a first optical transmission line including a plurality of first optical waveguide portions, the leading end being located adjacent to the second optical connector module; and a housing covering the first optical connector, the second optical connector module comprising:

a second optical connector attached to a second optical transmission line including a substrate and a second optical waveguide portion stacked on the substrate, the second optical connector being mated with the first optical connector; and a casing located apart from the second optical connector and attached to the substrate, wherein, in a mating direction in which the first optical connector module and the second optical connector module are mated with each other, a leading end of the housing is located closer to the second optical connector module than a leading end of the first optical connector, and a leading end of the casing is located closer to the first optical connector module than a leading end of the second optical connector, wherein the housing includes a first base covering the first optical connector and a protrusion protruding from the first base toward the second optical connector module in the mating direction, and a leading end of the protrusion is located closer to the second optical connector module than the leading end of the first optical connector in the mating direction, wherein the casing includes a first supporting portion located further from the substrate than the second optical connector and supporting the protrusion of the housing in a direction away from the substrate, and wherein the casing includes a second base covering the second optical connector, and the second base includes a ceiling portion located remote from the substrate and facing the second optical connector, and the first supporting portion extends from the ceiling portion toward the substrate while being bent.

2. The optical connector system according to claim 1, wherein the casing further includes one or more first supporting portions, and the first supporting portions are spaced apart from each other in the mating direction.

3. The optical connector system according to claim 1, wherein the casing includes a reinforcing portion included in the ceiling portion of the second base and located between one of the first supporting portions spaced apart from each other in the mating direction and another adjacent one of the first supporting portions.

4. The optical connector system according to claim 3, wherein the casing includes a guiding portion protruding from the reinforcing portion toward the first optical connector module and including a leading end located adjacent to the first optical connector module that extends obliquely away from the substrate.

5. The optical connector system according to claim 1, wherein the housing includes a supported portion located at an outer edge of the protrusion in a direction orthogonal to the mating direction, and the supported portion extends in the mating direction and is supported by the first supporting portion, and wherein the supported portion includes a surface facing toward the substrate and located remoter from the substrate than a surface of the protrusion that faces toward the substrate.

6. The optical connector system according to claim 1, wherein the housing includes at least one locked portion, wherein the casing includes at least one locking portion engaging the locked portion, and wherein at least one locking structure including the locked portion and the locking portion is located in an end portion of the optical connector system that is located at a position other than on a substrate side.

7. The optical connector system according to claim 6, wherein the locking structure is a single locking structure located in an end portion of the optical connector system that is located remote from the substrate.

8. The optical connector system according to claim 7, wherein the locked portion is a single locked portion located in the protrusion, wherein the locking portion is a single locking portion extending from the second base covering the second optical connector, and wherein the locking structure is a single locking structure located in only the end portion of the optical connector system located remote from the substrate.

9. The optical connector system according to claim 1, wherein the casing includes a second supporting portion located closer to the substrate than the second optical connector and supporting the first optical connector module in a direction away from the substrate.

10. The optical connector system according to claim 9, wherein the leading end of the casing in the mating direction is located at an end of the casing that is located remote from the substrate, and wherein the second supporting portion is located further on a second-optical-connector-module side than the leading end of the casing and is configured to guide, on a substrate side, the first optical connector module.

* * * * *